US011217272B2

(12) United States Patent
Suto et al.

(10) Patent No.: US 11,217,272 B2
(45) Date of Patent: Jan. 4, 2022

(54) MAGNETIC HEAD INCLUDING STACKED BODY HAVING PLURAL OF INTERMEDIATE LAYERS AND MAGNETIC RECORDING DEVICE INCLUDING SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hirofumi Suto, Tokyo (JP); Naoyuki Narita, Funabashi Chiba (JP); Tazumi Nagasawa, Yokohama Kanagawa (JP); Masayuki Takagishi, Kunitachi Tokyo (JP); Hitoshi Iwasaki, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/015,493

(22) Filed: Sep. 9, 2020

(65) Prior Publication Data

US 2021/0217440 A1 Jul. 15, 2021

(30) Foreign Application Priority Data

Jan. 15, 2020 (JP) .............................. JP2020-004369

(51) Int. Cl.
*G11B 5/23* (2006.01)
*G11B 5/31* (2006.01)
(Continued)

(52) U.S. Cl.
CPC .............. *G11B 5/1278* (2013.01); *G11B 5/02* (2013.01); *G11B 5/11* (2013.01); *G11B 5/235* (2013.01);
(Continued)

(58) Field of Classification Search
None
See application file for complete search history.

(56) References Cited

U.S. PATENT DOCUMENTS 9,747,932 B1 * 8/2017 Taguchi ................. G11B 5/235
10,672,419 B1 * 6/2020 Matsumoto ............ G11B 5/012
(Continued)

FOREIGN PATENT DOCUMENTS

JP 2019-57337 A 4/2019
JP 2019-57338 A 4/2019

*Primary Examiner* — Jefferson A Evans
(74) *Attorney, Agent, or Firm* — Finnegan, Henderson, Farabow, Garrett & Dunner L.L.P.

(57) ABSTRACT

According to one embodiment, a magnetic head includes a recording portion. The recording portion includes a magnetic pole, a shield, and a stacked body provided between the magnetic pole and the shield. The stacked body includes a first magnetic layer, a first layer provided between the first magnetic layer and the magnetic pole, and a first intermediate layer provided between the first magnetic layer and the shield. The first layer contacts the magnetic pole and includes at least one selected from the group consisting of IrMn, PtMn, FeMn, PdMn, NiMn, RhMn, MnCr, and PtCr. The first intermediate layer includes at least one selected from a first group consisting of Cu, Ag, Au, Al, Cr, and Ru.

11 Claims, 22 Drawing Sheets

(51) Int. Cl.
  *G11B 5/127* (2006.01)
  *G11B 5/02* (2006.01)
  *G11B 5/11* (2006.01)
  *G11B 5/235* (2006.01)
(52) U.S. Cl.
  CPC .......... *G11B 5/3109* (2013.01); *G11B 5/3133* (2013.01); *G11B 5/3146* (2013.01)

(56) References Cited

U.S. PATENT DOCUMENTS

| | | | |
|---|---|---|---|
| 10,896,690 B1* | 1/2021 | Bai | G11B 5/115 |
| 10,950,258 B1* | 3/2021 | Gao | G11B 5/3146 |
| 10,997,993 B1* | 5/2021 | Freitag | G11B 5/3143 |
| 2010/0073826 A1* | 3/2010 | Araki | G11B 5/40 |
| | | | 360/319 |
| 2010/0214692 A1* | 8/2010 | Kief | G11B 5/3156 |
| | | | 360/125.03 |
| 2011/0096443 A1* | 4/2011 | Zhang | G01R 33/098 |
| | | | 360/324.2 |
| 2012/0295133 A1* | 11/2012 | Min | G11B 5/3116 |
| | | | 428/815.2 |
| 2013/0057983 A1* | 3/2013 | Tanabe | G11B 5/1278 |
| | | | 360/234.3 |
| 2015/0380022 A1* | 12/2015 | Koui | G11B 5/3133 |
| | | | 360/99.08 |
| 2019/0088274 A1 | 3/2019 | Narita et al. | |
| 2019/0088275 A1 | 3/2019 | Narita et al. | |
| 2019/0267029 A1* | 8/2019 | Bai | G11B 5/235 |
| 2019/0279668 A1* | 9/2019 | Freitag | G11B 5/1278 |
| 2020/0082845 A1* | 3/2020 | Suto | G11B 5/235 |
| 2020/0176022 A1* | 6/2020 | Li | G11B 5/11 |

\* cited by examiner

MAGNETIC HEAD INCLUDING STACKED BODY HAVING PLURAL OF INTERMEDIATE LAYERS AND MAGNETIC RECORDING DEVICE INCLUDING SAME

CROSS-REFERENCE TO RELATED APPLICATIONS

This application is based upon and claims the benefit of priority from Japanese Patent Application No. 2020-004369, filed on Jan. 15, 2020; the entire contents of which are incorporated herein by reference.

FIELD

An embodiment of the invention generally relates to a magnetic head and a magnetic recording device.

BACKGROUND

Information is recorded in a magnetic storage medium such as a HDD (Hard Disk Drive) or the like by using a magnetic head. It is desirable to increase the recording density of the magnetic head and the magnetic recording device.

DETAILED DESCRIPTION

Figure 1:
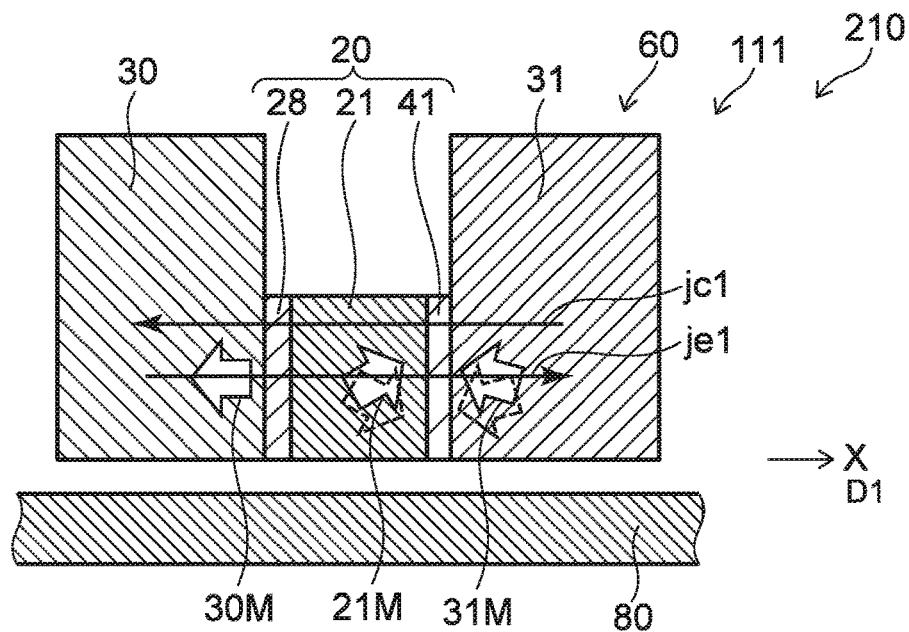
FIG. 1 is a schematic cross-sectional view illustrating a magnetic head according to a first embodiment.

According to one embodiment, a magnetic head includes a recording portion. The recording portion includes a magnetic pole, a shield, and a stacked body provided between the magnetic pole and the shield. The stacked body includes a first magnetic layer, a first layer provided between the first magnetic layer and the magnetic pole, and a first intermediate layer provided between the first magnetic layer and the shield. The first layer contacts the magnetic pole and includes at least one selected from the group consisting of IrMn, PtMn, FeMn, PdMn, NiMn, RhMn, MnCr, and PtCr. The first intermediate layer includes at least one selected from a first group consisting of Cu, Ag, Au, A1, Cr, and Ru.

According to one embodiment, a magnetic head includes a recording portion. The recording portion includes a magnetic pole, a shield, and a stacked body provided between the magnetic pole and the shield. The stacked body includes a first magnetic layer, a first layer provided between the first magnetic layer and the shield, and a first intermediate layer provided between the first magnetic layer and the magnetic pole. The first layer contacts the shield and includes at least one selected from the group consisting of IrMn, PtMn, FeMn, PdMn, NiMn, RhMn, MnCr, and PtCr. The first intermediate layer includes at least one selected from a first group consisting of Cu, Ag, Au, A1, Cr, and Ru.

According to another embodiment, a magnetic head includes a recording portion. The recording portion includes a magnetic pole, a shield, and a stacked body provided between the magnetic pole and the shield. The stacked body includes a first magnetic layer, a second magnetic layer provided between the first magnetic layer and the magnetic pole, a first layer provided between the second magnetic layer and the magnetic pole, a first intermediate layer provided between the first magnetic layer and the second magnetic layer, and a shield-side first intermediate layer provided between the first magnetic layer and the shield. The first layer contacts the magnetic pole and includes at least one selected from the group consisting of IrMn, PtMn, FeMn, PdMn, NiMn, RhMn, MnCr, and PtCr. The first intermediate layer includes at least one selected from a first group consisting of Cu, Ag, Au, Al, Cr, and Ru. The shield-side first intermediate layer includes at least one selected from the group consisting of Ta, Pt, W, Ir, Mo, Cr, Tb, Mn, and Ni.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

As shown in FIG. 1, the magnetic head 111 according to the embodiment includes a recording portion 60. The magnetic head is included in a magnetic recording device 210. The magnetic recording device 210 includes the magnetic head 111 and a magnetic recording medium 80. Information is recorded in the magnetic recording medium 80 by the recording portion 60 of the magnetic head 111. The magnetic recording medium 80 is, for example, a perpendicular recording medium. Examples of the magnetic recording medium 80 are described below.

As shown in FIG. 1, the magnetic head 111 includes a magnetic pole 30, a shield 31, and a stacked body 20. The stacked body 20 is provided between the magnetic pole 30 and the shield 31. The shield 31 is, for example, the trailing shield.

As shown in FIG. 1, the stacked body 20 includes a first magnetic layer 21, a first layer 28, and a first intermediate layer 41.

The first layer 28 is provided between the first magnetic layer 21 and the magnetic pole 30. The first layer 28 contacts the magnetic pole 30. The first layer 28 includes, for example, at least one selected from the group consisting of IrMn, PtMn, FeMn, PdMn, NiMn, RhMn, MnCr, and PtCr. The first layer 28 is, for example, an antiferromagnet layer.

The first intermediate layer 41 is provided between the first magnetic layer 21 and the shield 31. The first intermediate layer 41 includes at least one selected from a first group consisting of Cu, Ag, Au, Al, Cr, and Ru. For example, the first intermediate layer 41 functions as a layer that transmits spin.

The first magnetic layer 21 includes at least one first element selected from the group consisting of Co, Fe, and Ni. The concentration of the first element in the first magnetic layer 21 is 50 atomic % or more. The first magnetic layer 21 includes, for example, an FeCo alloy or a NiFe alloy.

The magnetic pole 30 is, for example, a major magnetic pole. For example, the magnetic pole 30 and the shield 31 form a magnetic circuit. As described below, a coil is provided at the magnetic pole 30 (and/or the shield 31). A recording magnetic field that corresponds to a recording current flowing in the coil is generated from the magnetic pole 30. At least a portion of the generated recording magnetic field is oriented toward the magnetic recording medium 80. At least a portion of the recording magnetic field is applied to the magnetic recording medium 80. The orientation of the magnetization of the portion of the magnetic recording medium 80 to which the recording magnetic field is applied is controlled by the recording magnetic field. Thereby, information that corresponds to the orientation of the recording magnetic field is recorded in the magnetic recording medium 80. For example, at least a portion of the recording magnetic field is oriented toward the shield 31 after being oriented toward the magnetic recording medium 80.

The direction from the magnetic pole 30 toward the shield 31 is taken as a first direction. The first direction is along an X-axis direction. The X-axis direction is, for example, the down-track direction.

A current can be supplied to the stacked body 20. For example, as described below, a current is supplied to the stacked body 20 via the magnetic pole 30 and the shield 31. The current is supplied from an electrical circuit 20D described below (referring to FIG. 25).

As shown in FIG. 1, a current jc1 that has an orientation from the shield 31 toward the magnetic pole 30 is supplied to the stacked body 20. An electron current je1 that has an orientation from the magnetic pole 30 toward the shield 31 flows in the stacked body 20. For example, the current jc1 (and the electron current je1) are set to have magnitudes that cause a magnetization 21M of the first magnetic layer 21 to reverse.

Due to such a current jc1, the orientation of the magnetization 21M of the first magnetic layer 21 has a component having the reverse orientation of a magnetization 30M of the magnetic pole 30 (and the orientation of a magnetization 31M of the shield 31). Thereby, the recording magnetic field that is generated from the magnetic pole 30 does not easily pass through the stacked body 20. Thereby, much of the recording magnetic field generated from the magnetic pole 30 is easily oriented toward the magnetic recording medium 80. The recording magnetic field is efficiently applied to the magnetic recording medium 80.

For example, when the distance between the magnetic pole 30 and the shield 31 is reduced to increase the recording density, the recording magnetic field that is generated from the magnetic pole 30 easily enters the shield 31 without being oriented toward the magnetic recording medium 80. At this time, in the embodiment, the recording magnetic field is effectively oriented toward the magnetic recording medium 80 even when the distance between the magnetic pole 30 and the shield 31 is short because the magnetization 21M is reversed. The recording magnetic field can be effectively applied to the magnetic recording medium 80 even when the distance (the recording gap) between the magnetic pole 30 and the shield 31 is short. Thereby, a magnetic head and a magnetic recording device can be provided in which the recording density can be increased.

In the embodiment, the first layer 28 that contacts the magnetic pole 30 is provided between the first magnetic layer 21 and the magnetic pole 30. As described above, the first layer 28 is an antiferromagnet layer. By providing the first layer 28, for example, dynamic coupling between the magnetic pole 30 and the first magnetic layer 21 is suppressed. It is considered that this is because the damping and/or the ferromagnetic resonant frequency of the magnetization at the surface of the magnetic pole 30 is modulated by the first layer 28. By suppressing the dynamic coupling, the current (the operating current) at which the magnetization 21M of the first magnetic layer 21 reverses can be reduced. Because the operating current can be reduced, the stacked body 20 can be downsized, and the recording gap can be reduced. Thereby, for example, a magnetic head can be provided in which the recording density can be increased.

Figure 2:
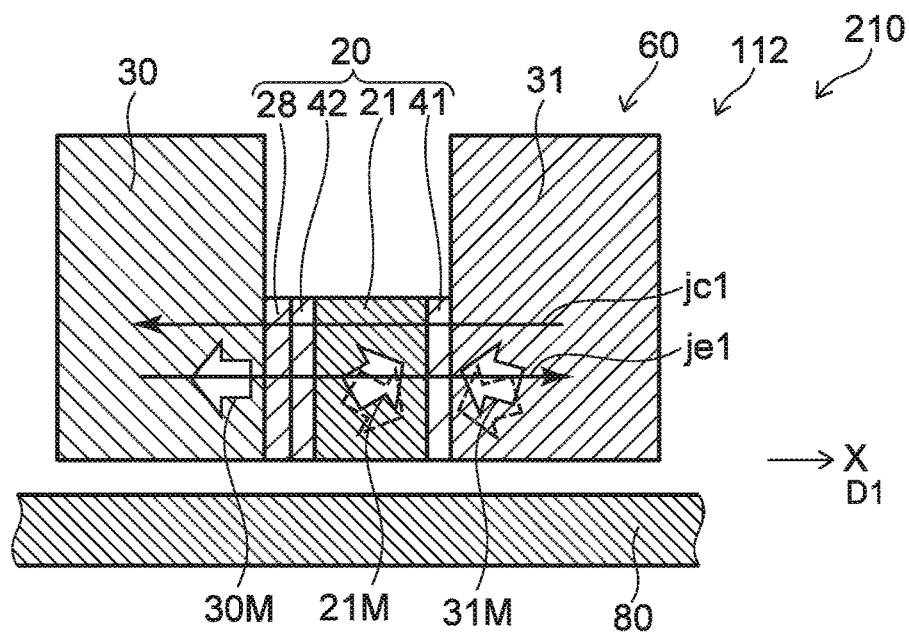
FIG. 2 is a schematic cross-sectional view illustrating a magnetic head according to the first embodiment.

FIG. 2 is a schematic cross-sectional view illustrating a magnetic head according to the first embodiment.

In the magnetic head 112 according to the embodiment as shown in FIG. 2, the stacked body 20 further includes a second intermediate layer 42. The second intermediate layer 42 is provided between the first magnetic layer 21 and the first layer 28. The second intermediate layer 42 includes at least one selected from a second group consisting of Cu, Ag, Au, Al, Cr, Ru, and Ta. For example, the second intermediate layer 42 functions as a layer that reduces the damping. By providing the second intermediate layer 42, the operating current can be reduced further.

Figure 3:
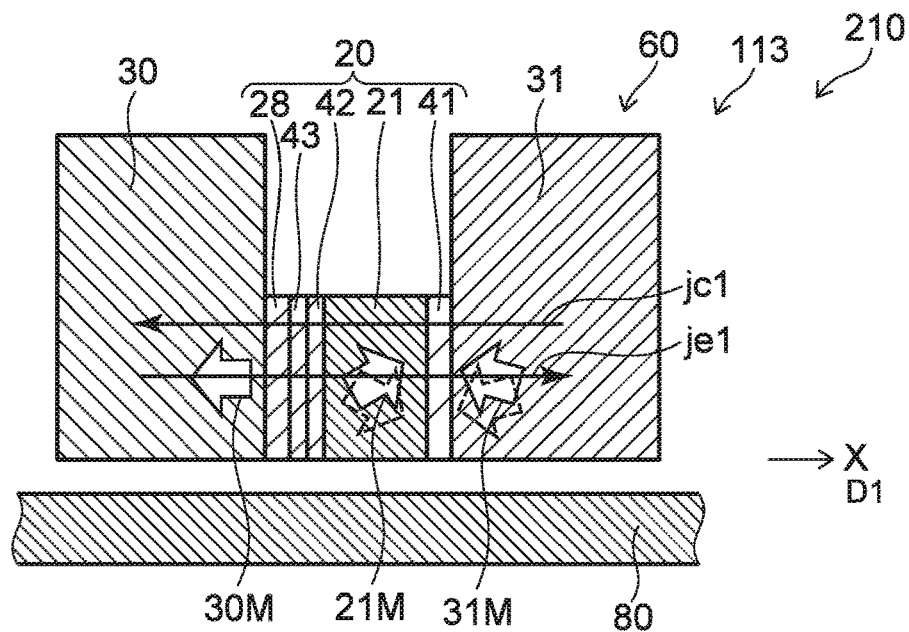
FIG. 3 is a schematic cross-sectional view illustrating a magnetic head according to the first embodiment.

FIG. 3 is a schematic cross-sectional view illustrating a magnetic head according to the first embodiment.

In the magnetic head 113 according to the embodiment as shown in FIG. 3, the stacked body 20 further includes a third intermediate layer 43 in addition to the second intermediate layer 42. The third intermediate layer 43 is provided between the second intermediate layer 42 and the first layer 28. The third intermediate layer 43 includes at least one selected from a third group consisting of Ta, Pt, W, Ir, Mo, Cr, Tb, Mn, and Ni. For example, the third intermediate layer 43 functions as a layer that attenuates (e.g., quenches) the spin. By providing the third intermediate layer 43, the operating current can be reduced further.

Figure 4:
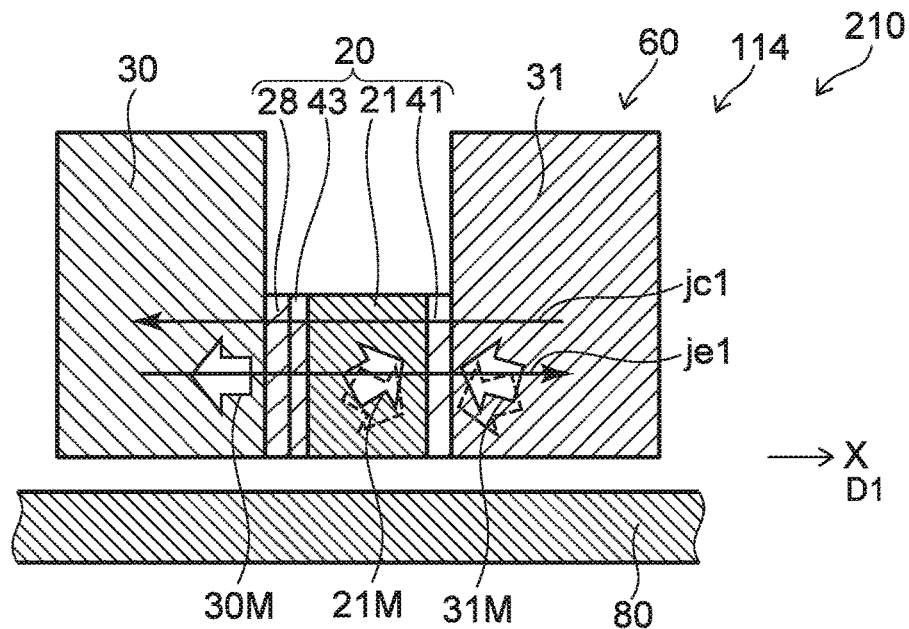
FIG. 4 is a schematic cross-sectional view illustrating a magnetic head according to the first embodiment.

FIG. 4 is a schematic cross-sectional view illustrating a magnetic head according to the first embodiment.

In the magnetic head 114 according to the embodiment as shown in FIG. 4, the stacked body 20 includes the third intermediate layer 43 but does not include the second intermediate layer 42. The third intermediate layer 43 is provided between the first magnetic layer 21 and the first layer 28. The third intermediate layer 43 includes at least one selected from the third group consisting of Ta, Pt, W, Ir, Mo, Cr, Tb, Mn, and Ni. In such a case as well, for example, the third intermediate layer 43 functions as a layer that attenuates (e.g., quenches) the spin. By providing the third intermediate layer 43, the operating current can be reduced further.

Figure 5:
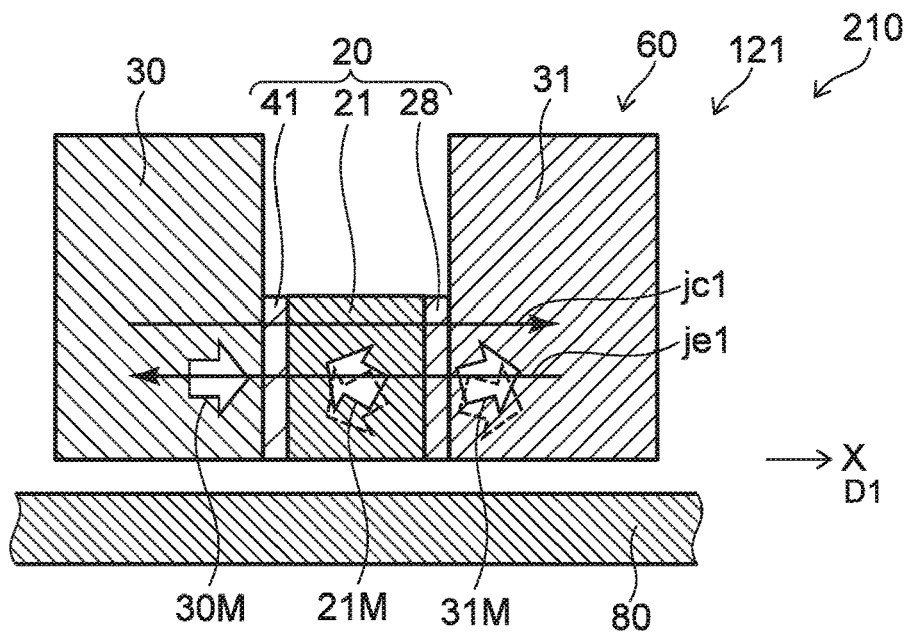
FIG. 5 is a schematic cross-sectional view illustrating a magnetic head according to the first embodiment.

FIG. 5 is a schematic cross-sectional view illustrating a magnetic head according to the first embodiment.

In the magnetic head 121 according to the embodiment as shown in FIG. 5 as well, the recording portion 60 includes the magnetic pole 30, the shield 31, and the stacked body 20. The stacked body 20 includes the first magnetic layer 21, the first layer 28, and the first intermediate layer 41. The first layer 28 is provided between the first magnetic layer 21 and the shield 31. The first layer 28 contacts the shield 31. The first layer 28 includes at least one selected from the group consisting of IrMn, PtMn, FeMn, PdMn, NiMn, RhMn, MnCr, and PtCr.

The first intermediate layer 41 is provided between the first magnetic layer 21 and the magnetic pole 30. The first intermediate layer 41 includes at least one selected from the first group consisting of Cu, Ag, Au, Al, Cr, and Ru.

In the magnetic head 121 as shown in FIG. 5, the current jc1 that has an orientation from the magnetic pole 30 toward the shield 31 flows in the stacked body 20. The electron current je1 that has an orientation from the shield 31 toward the magnetic pole 30 flows in the stacked body 20. For example, the current jc1 (and the electron current je1) are set to magnitudes that cause the magnetization 21M of the first magnetic layer 21 to reverse.

In the magnetic head 121 as well, the dynamic coupling between the shield 31 and the first magnetic layer 21 is suppressed by providing the first layer 28. The operating current can be reduced thereby; the stacked body 20 can be downsized, and the recording gap can be reduced. Thereby, for example, a magnetic head can be provided in which the recording density can be increased.

Figure 6:
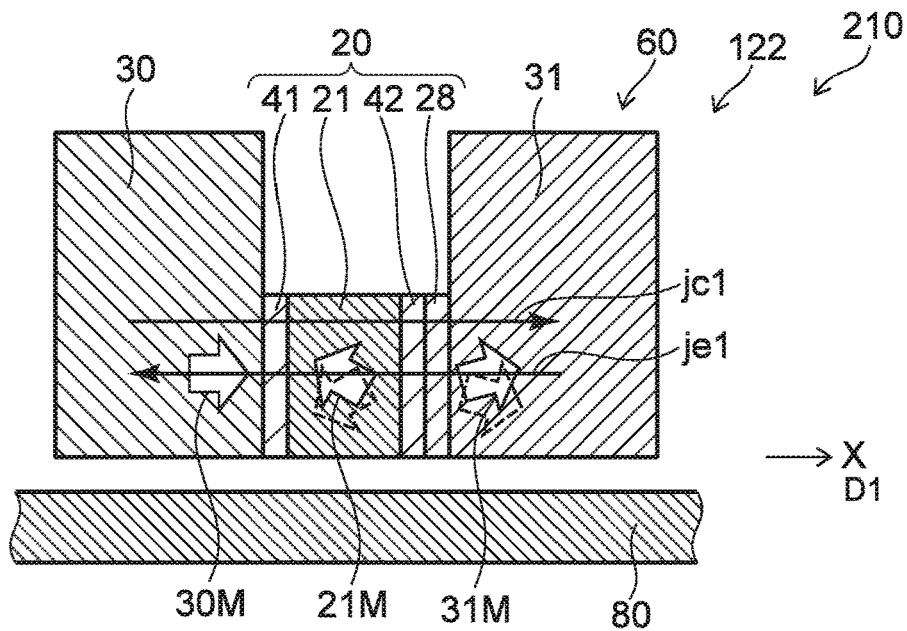
FIG. 6 is a schematic cross-sectional view illustrating a magnetic head according to the first embodiment.

FIG. 6 is a schematic cross-sectional view illustrating a magnetic head according to the first embodiment.

In the magnetic head 122 according to the embodiment as shown in FIG. 6, the stacked body 20 further includes the second intermediate layer 42. The second intermediate layer 42 is provided between the first magnetic layer 21 and the first layer 28. The second intermediate layer 42 includes at least one selected from the second group consisting of Cu, Ag, Au, Al, Cr, Ru, and Ta.

For example, the damping can be reduced by the second intermediate layer 42. By providing the second intermediate layer 42, the operating current can be reduced further.

Figure 7:
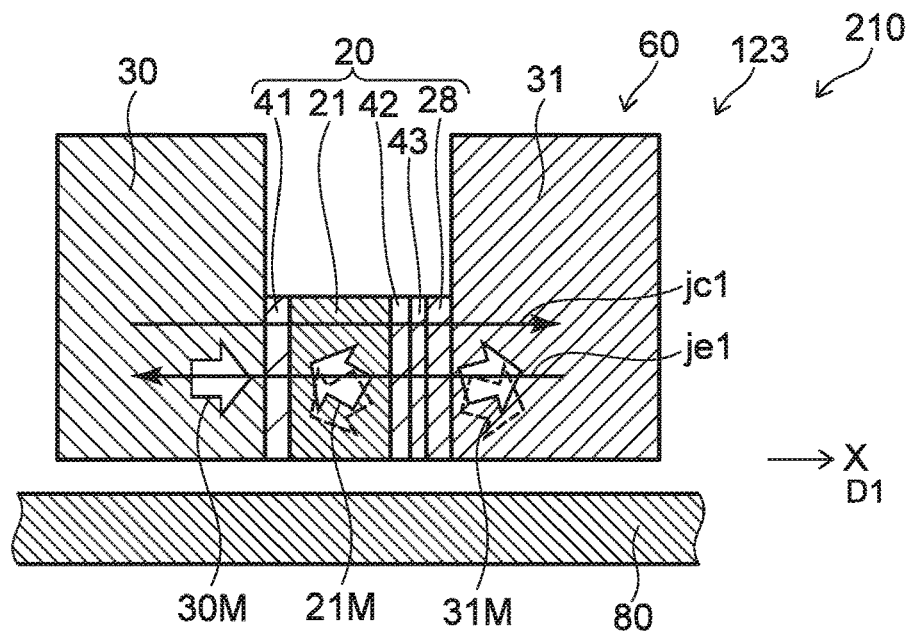
FIG. 7 is a schematic cross-sectional view illustrating a magnetic head according to the first embodiment.

FIG. 7 is a schematic cross-sectional view illustrating a magnetic head according to the first embodiment.

In the magnetic head 123 according to the embodiment as shown in FIG. 7, the stacked body 20 further includes the third intermediate layer 43. The third intermediate layer 43 is provided between the second intermediate layer 42 and the first layer 28. The third intermediate layer 43 includes at least one selected from the third group consisting of Ta, Pt, W, Ir, Mo, Cr, Tb, Mn, and Ni. For example, the spin is attenuated or quenched by the third intermediate layer 43. By providing the third intermediate layer 43, the operating current can be reduced further.

Figure 8:
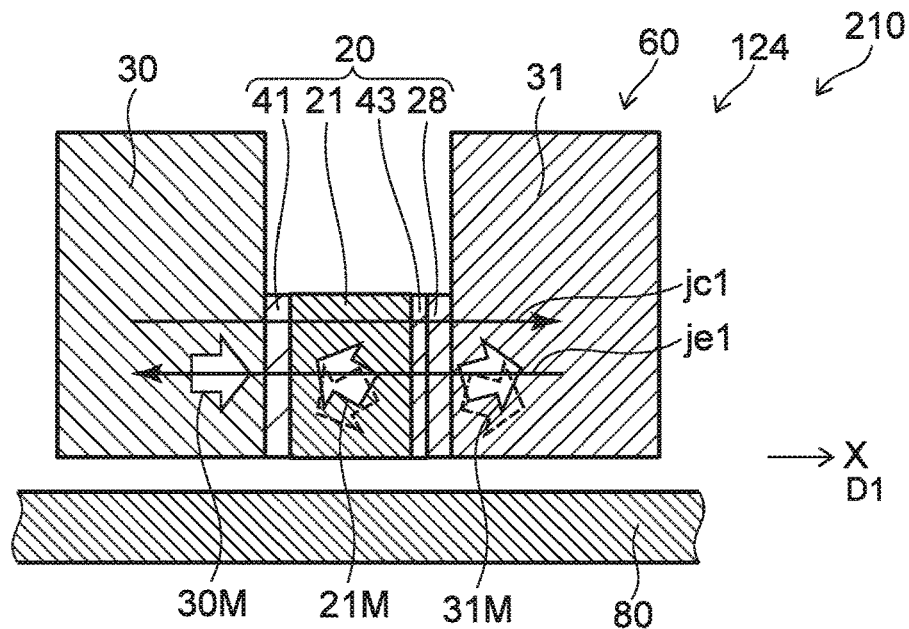
FIG. 8 is a schematic cross-sectional view illustrating a magnetic head according to the first embodiment.

FIG. 8 is a schematic cross-sectional view illustrating a magnetic head according to the first embodiment.

In the magnetic head 124 according to the embodiment as shown in FIG. 8, the stacked body 20 includes the third intermediate layer 43 but does not include the second intermediate layer 42. The third intermediate layer 43 is provided between the first magnetic layer 21 and the first layer 28. The third intermediate layer 43 includes at least one selected from the third group consisting of Ta, Pt, W, Ir, Mo, Cr, Tb, Mn, and Ni. In such a case as well, for example, the third intermediate layer 43 functions as a layer that attenuates (e.g., quenches) the spin.

By providing the third intermediate layer 43, the operating current can be reduced further.

Second Embodiment

FIG. 9A, FIG. 9B, FIG. 10A, and FIG. 10B are schematic cross-sectional views illustrating magnetic heads according to a second embodiment.

Figure 9A:
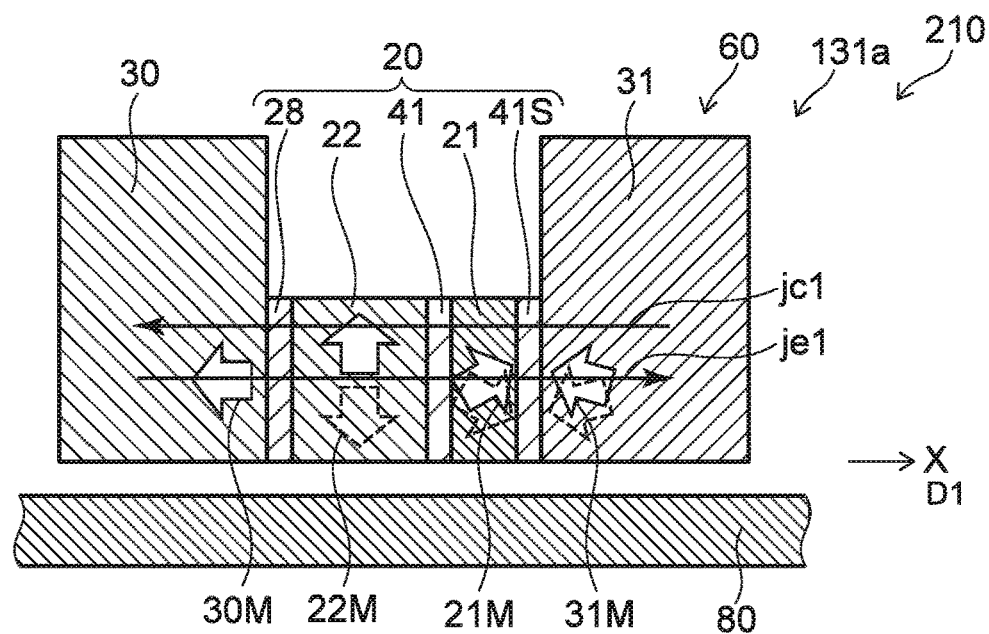
FIG. 9A and FIG. 9B are schematic cross-sectional views illustrating magnetic heads according to a second embodiment.

As shown in FIG. 9A, a magnetic head 131a according to the embodiment includes the recording portion 60. The recording portion 60 includes the magnetic pole 30, the shield 31, and the stacked body 20 provided between the magnetic pole 30 and the shield 31. The stacked body 20 includes the first magnetic layer 21, a second magnetic layer 22, the first layer 28, the first intermediate layer 41, and a shield-side first intermediate layer 41S. The second magnetic layer 22 is provided between the first magnetic layer 21 and the magnetic pole 30.

The first layer 28 is provided between the second magnetic layer 22 and the magnetic pole 30. The first layer 28 contacts the magnetic pole 30. The first layer 28 includes at least one selected from the group consisting of IrMn, PtMn, FeMn, PdMn, NiMn, RhMn, MnCr, and PtCr.

The first intermediate layer 41 is provided between the first magnetic layer 21 and the second magnetic layer 22. The first intermediate layer 41 includes at least one selected from the first group consisting of Cu, Ag, Au, Al, Cr, and Ru. For example, the first intermediate layer 41 functions as a layer that transmits the spin.

The shield-side first intermediate layer 41S is provided between the first magnetic layer 21 and the shield 31. The shield-side first intermediate layer 41S includes at least one selected from the group consisting of Ta, Pt, W, Ir, Mo, Cr, Tb, Mn, and Ni. For example, the shield-side first intermediate layer 41S functions as a layer that attenuates (e.g., quenches) the spin.

For example, the current jc1 that has an orientation from the shield 31 toward the magnetic pole 30 flows in the stacked body 20. The electron current je1 that has an orientation from the magnetic pole 30 toward the shield 31 flows in the stacked body 20. An alternating-current magnetic field is generated in the stacked body 20 by such a current jc1 (electron current je1). The first magnetic layer 21, the second magnetic layer 22, and the first intermediate layer 41 function as a STO (spin-torque oscillator). For example, the first magnetic layer 21 functions as a spin injection layer. The second magnetic layer 22 functions as an oscillation generation layer. A magnetization 22M of the second magnetic layer 22 rotates.

The alternating-current magnetic field (the high frequency magnetic field) that is generated in the stacked body 20 is applied to a portion of the magnetic recording medium 80. The magnetization changes more easily at the application portion. For example, MAMR (Microwave Assisted Magnetic Recording) is performed.

In the embodiment, the first layer 28 that contacts the magnetic pole 30 is provided between the second magnetic layer 22 and the magnetic pole 30. The first layer 28 is, for example, an antiferromagnet layer. By providing the first layer 28, for example, the dynamic coupling between the magnetic pole 30 and the second magnetic layer 22 is suppressed. It is considered that this is because the damping and/or the ferromagnetic resonant frequency of the magnetization at the surface of the magnetic pole 30 is modulated by the first layer 28. By suppressing the dynamic coupling, the current (the operating current) at which the oscillation is generated can be reduced. Because the operating current can be reduced, the stacked body 20 can be downsized, and the recording gap can be reduced. Thereby, for example, a magnetic head can be provided in which the recording density can be increased.

Figure 9B:
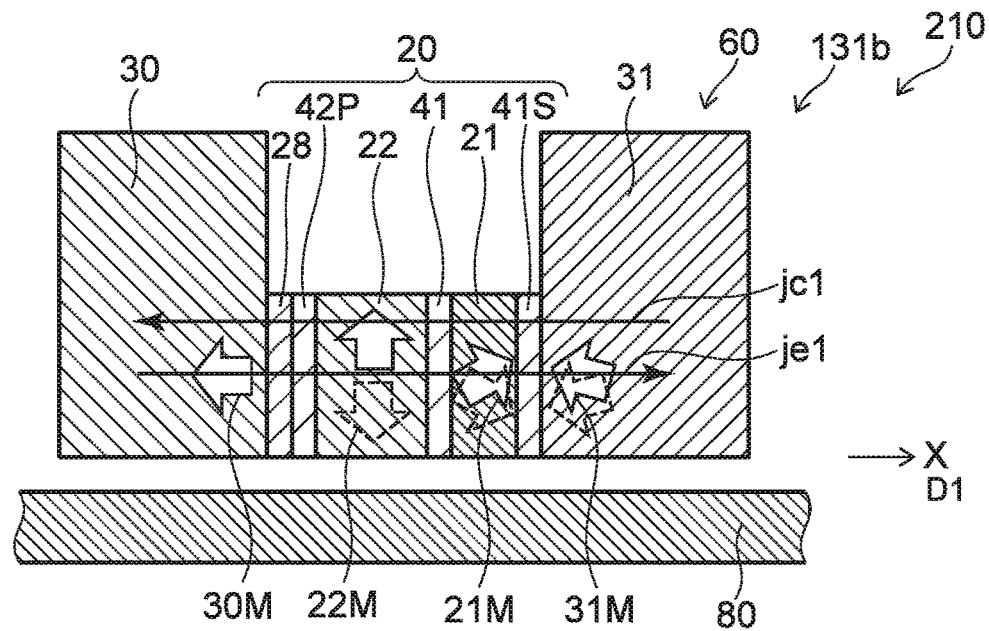

In a magnetic head 131b according to the embodiment as shown in FIG. 9B, the stacked body 20 further includes a magnetic pole-side second intermediate layer 42P. The magnetic pole-side second intermediate layer 42P is provided between the second magnetic layer 22 and the first layer 28. The magnetic pole-side second intermediate layer 42P includes at least one selected from the group consisting of Cu, Ag, Au, Al, Cr, Ru, and Ta. In the example, for example, the magnetic pole-side second intermediate layer 42P functions as a layer that reduces the damping. By providing the magnetic pole-side second intermediate layer 42P, the operating current can be reduced further.

Figure 10A:
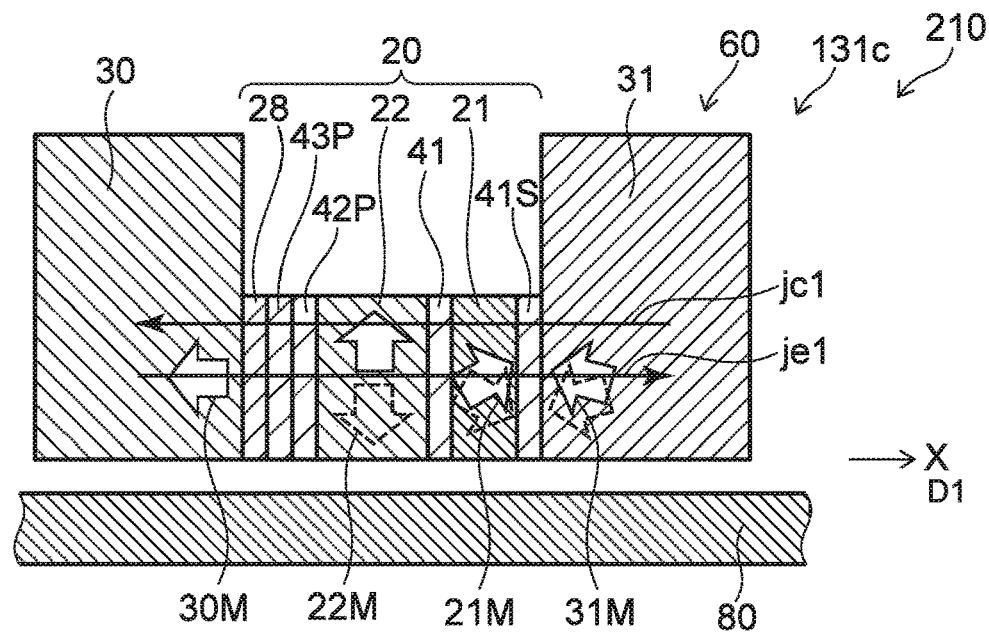
FIG. 10A and FIG. 10B are schematic cross-sectional views illustrating magnetic heads according to the second embodiment.

In a magnetic head 131c according to the embodiment as shown in FIG. 10A, the stacked body 20 further includes a magnetic pole-side third intermediate layer 43P. The magnetic pole-side third intermediate layer 43P is provided between the first layer 28 and the magnetic pole-side second intermediate layer 42P. The magnetic pole-side third intermediate layer 43P includes at least one selected from the group consisting of Ta, Pt, W, Ir, Mo, Cr, Tb, Mn, and Ni. For example, the magnetic pole-side third intermediate layer 43P functions as a layer that attenuates (e.g., quenches) the spin. By providing the magnetic pole-side third intermediate layer 43P, the operating current can be reduced further.

Figure 10B:
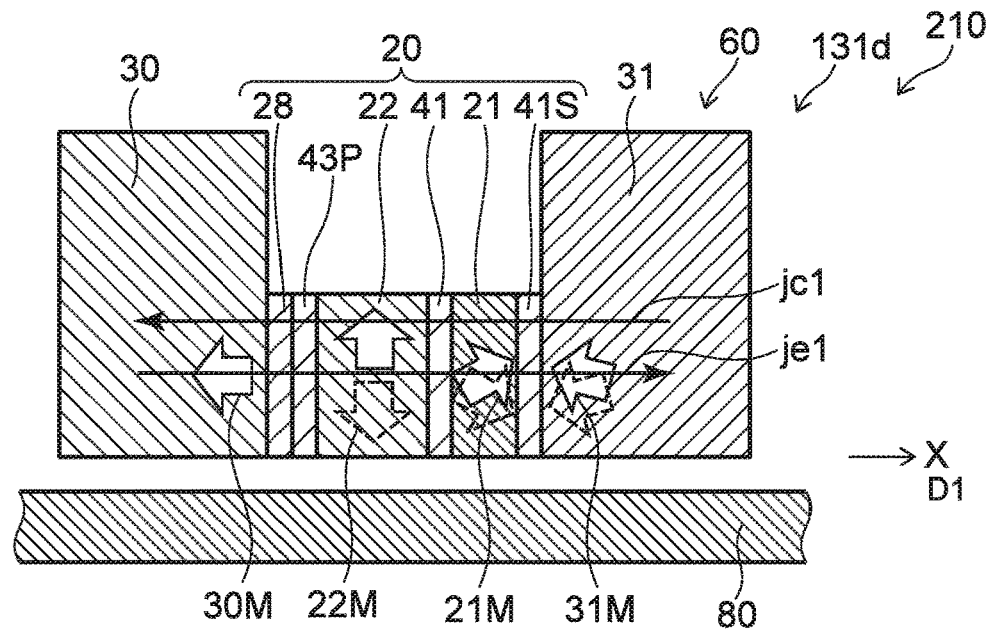
Figure 11A:
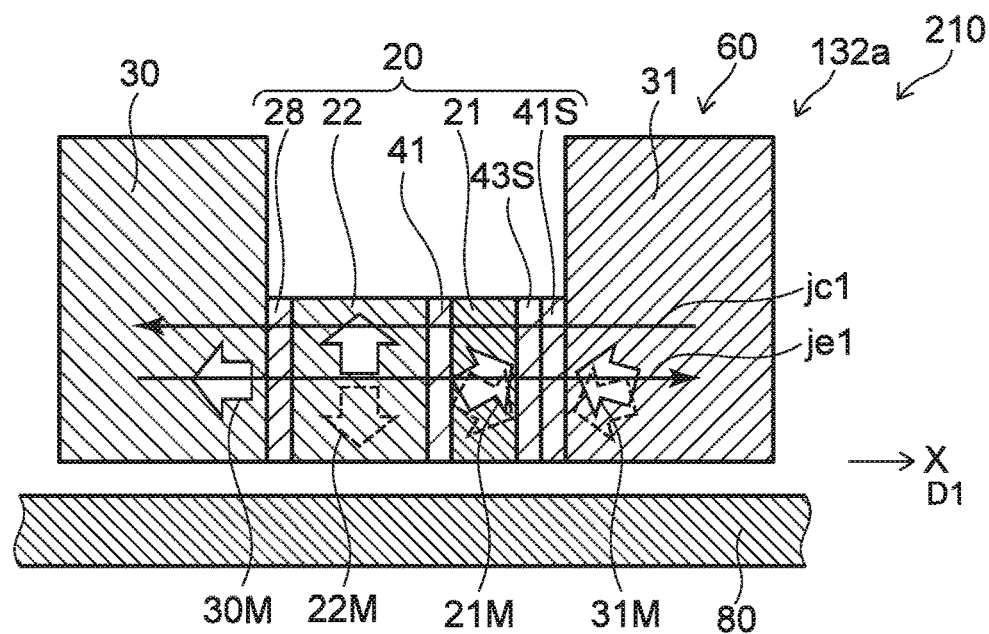
FIG. 11A and FIG. 11B are schematic cross-sectional views illustrating magnetic heads according to the second embodiment.
Figure 11B:
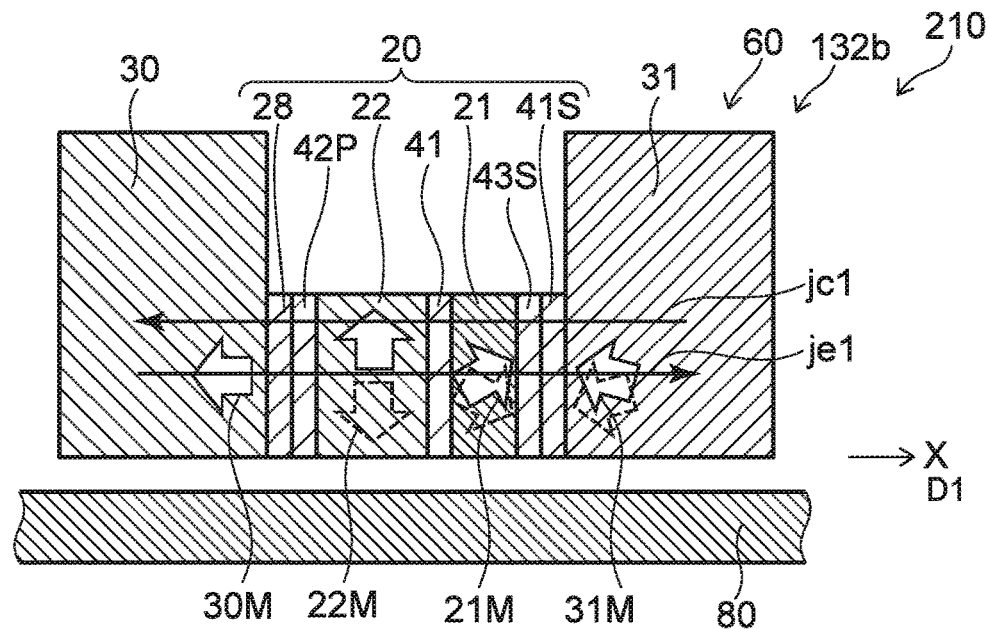
Figure 12A:
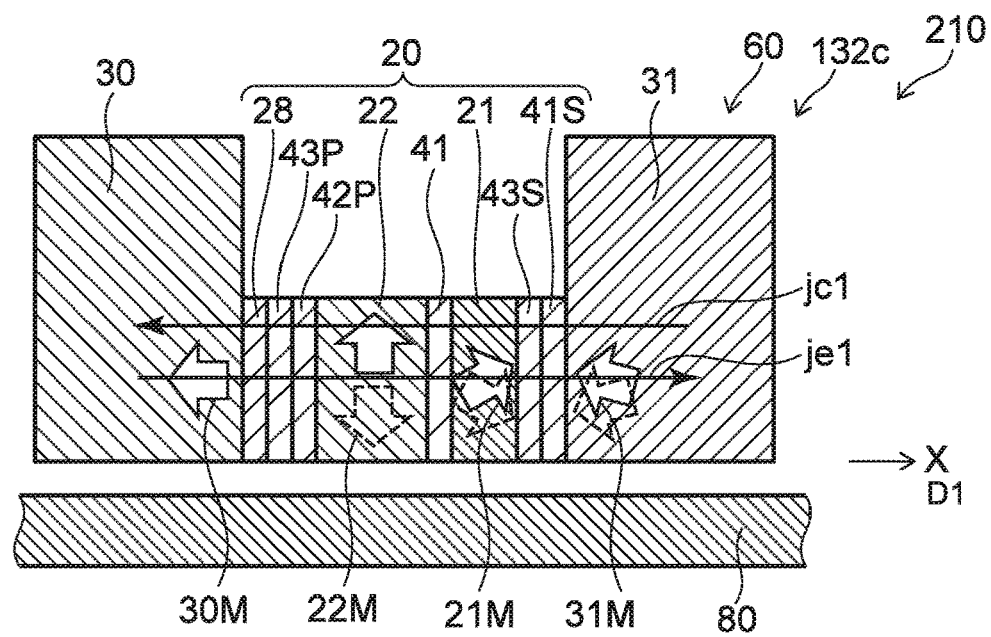
FIG. 12A and FIG. 12B are schematic cross-sectional views illustrating magnetic heads according to the second embodiment.
Figure 12B:
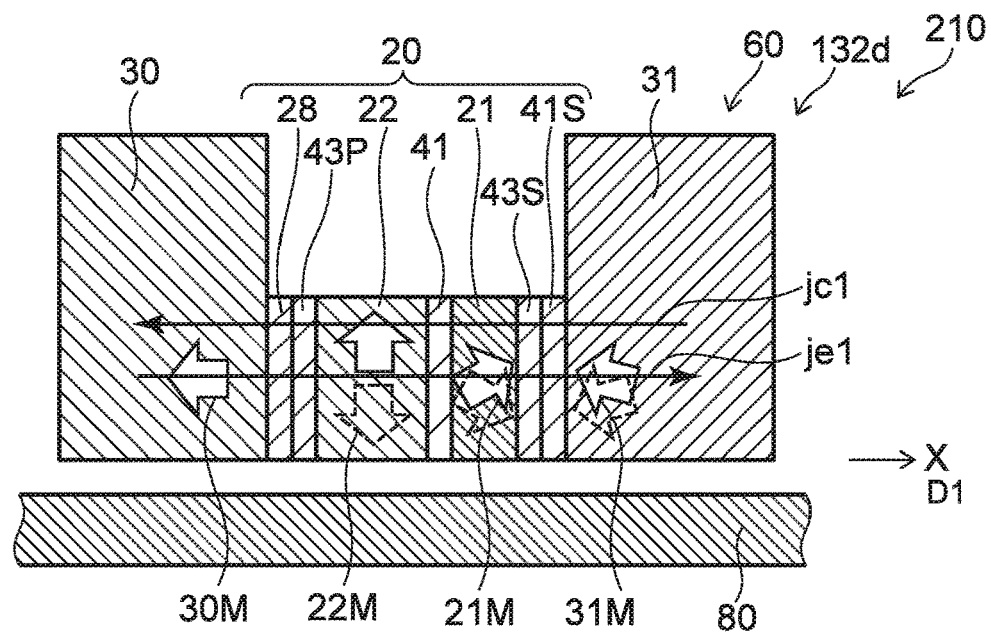

In a magnetic head 131d according to the embodiment as shown in FIG. 10B, the stacked body 20 includes the magnetic pole-side third intermediate layer 43P, and the magnetic pole-side second intermediate layer 42P is omitted. In this configuration as well, for example, the operating current can be reduced further.

FIG. 11A, FIG. 11B, FIG. 12A, and FIG. 12B are schematic cross-sectional views illustrating magnetic heads according to the second embodiment.

In magnetic heads 132a to 132d according to the embodiment as shown in FIG. 11A, FIG. 11B, FIG. 12A, and FIG. 12B, the stacked body 20 further includes a shield-side third intermediate layer 43S. The shield-side third intermediate layer 43S is provided between the first magnetic layer 21 and the shield-side first intermediate layer 41S. The shield-side third intermediate layer 43S includes at least one selected from the group consisting of Ta, Pt, W, Ir, Mo, Cr, Tb, Mn, and Ni. Otherwise, the magnetic heads 132a to 132d have configurations similar to those of the magnetic heads 131a to 131d. For example, the shield-side third intermediate layer 43S functions as a layer that attenuates (e.g., quenches) the spin. For example, the operating current can be reduced further.

FIG. 13A, FIG. 13B, FIG. 14A, and FIG. 14B are schematic cross-sectional views illustrating magnetic heads according to the second embodiment.

Figure 13A:
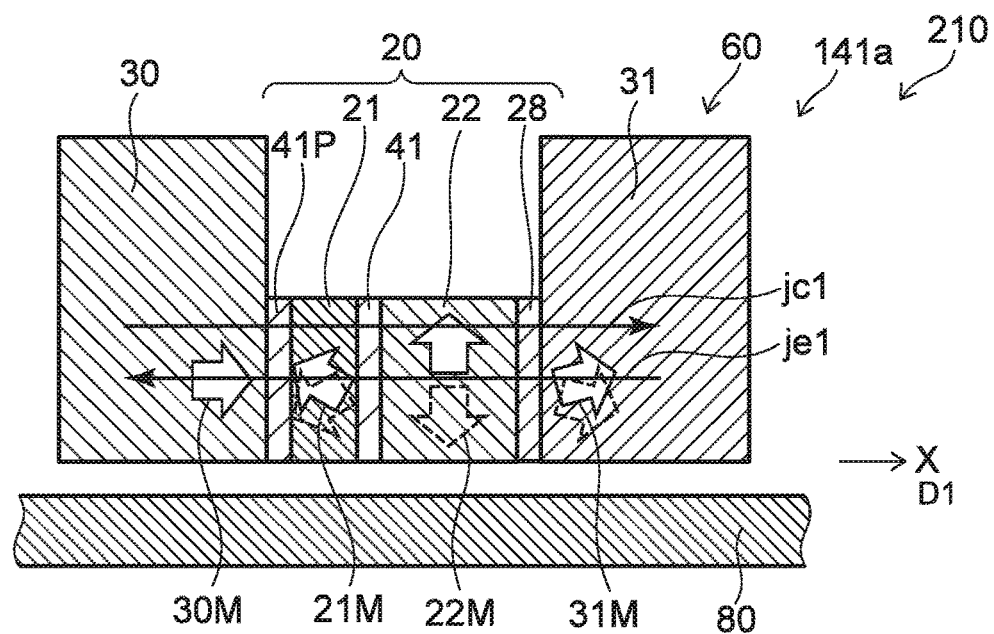
FIG. 13A and FIG. 13B are schematic cross-sectional views illustrating magnetic heads according to the second embodiment.

As shown in FIG. 13A, a magnetic head 141a according to the embodiment includes the recording portion 60. The recording portion 60 includes the magnetic pole 30, the shield 31, and the stacked body 20 provided between the magnetic pole 30 and the shield 31. The stacked body 20 includes the first magnetic layer 21, the second magnetic layer 22, the first layer 28, the first intermediate layer 41, and a magnetic pole-side first intermediate layer 41P. The second magnetic layer 22 is provided between the first magnetic layer 21 and the shield 31.

The first layer 28 is provided between the second magnetic layer 22 and the shield 31. The first layer 28 contacts the shield 31. The first layer 28 includes at least one selected from the group consisting of IrMn, PtMn, FeMn, PdMn, NiMn, RhMn, MnCr, and PtCr.

The first intermediate layer 41 is provided between the first magnetic layer 21 and the second magnetic layer 22. The first intermediate layer 41 includes at least one selected from the first group consisting of Cu, Ag, Au, Al, Cr, and Ru. For example, the first intermediate layer 41 functions as a layer that transmits the spin.

The magnetic pole-side first intermediate layer 41P is provided between the magnetic pole 30 and the first magnetic layer 21. The magnetic pole-side first intermediate layer 41P includes at least one selected from the group consisting of Ta, Pt, W, Ir, Mo, Cr, Tb, Mn, and Ni. For example, the magnetic pole-side first intermediate layer 41P functions as a layer that attenuates (e.g., quenches) the spin.

For example, the current jc1 that has an orientation from the magnetic pole 30 toward the shield 31 flows in the stacked body 20. The electron current je1 that has an orientation from the shield 31 toward the magnetic pole 30 flows in the stacked body 20. An alternating-current magnetic field is generated in the stacked body 20 by such a current jc1 (electron current je1). The first magnetic layer 21, the second magnetic layer 22, and the first intermediate layer 41 function as a STO. For example, the first magnetic layer 21 functions as a spin injection layer. The second magnetic layer 22 functions as an oscillation generation layer. The magnetization 22M of the second magnetic layer 22 rotates.

The alternating-current magnetic field (the high frequency magnetic field) that is generated in the stacked body 20 is applied to a portion of the magnetic recording medium 80. For example, MAMR is performed.

In the embodiment, the first layer 28 that contacts the shield 31 is provided between the second magnetic layer 22 and the shield 31. The first layer 28 is, for example, an antiferromagnet layer. By providing the first layer 28, for example, the dynamic coupling between the shield 31 and the second magnetic layer 22 is suppressed. It is considered that this is because the damping and/or the ferromagnetic resonant frequency of the magnetization at the surface of the shield 31 is modulated by the first layer 28. By suppressing the dynamic coupling, the current (the operating current) at which the oscillation is generated can be reduced. Because the operating current can be reduced, the stacked body 20 can be downsized, and the recording gap can be reduced. Thereby, for example, a magnetic head can be provided in which the recording density can be increased.

Figure 13B:
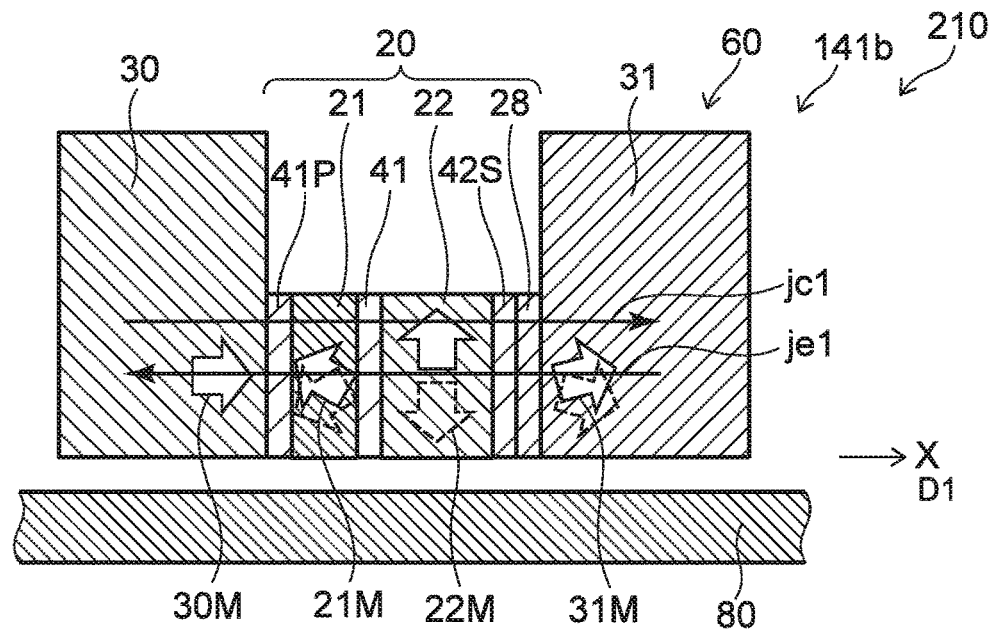

In a magnetic head 141b according to the embodiment as shown in FIG. 13B, the stacked body 20 further includes a shield-side second intermediate layer 42S. The shield-side second intermediate layer 42S is provided between the second magnetic layer 22 and the first layer 28. The shield-side second intermediate layer 42S includes at least one selected from the group consisting of Cu, Ag, Au, Al, Cr, Ru, and Ta. In the example, for example, the shield-side second intermediate layer 42S functions as a layer that reduces the damping. By providing the shield-side second intermediate layer 42S, the operating current can be reduced further.

Figure 14A:
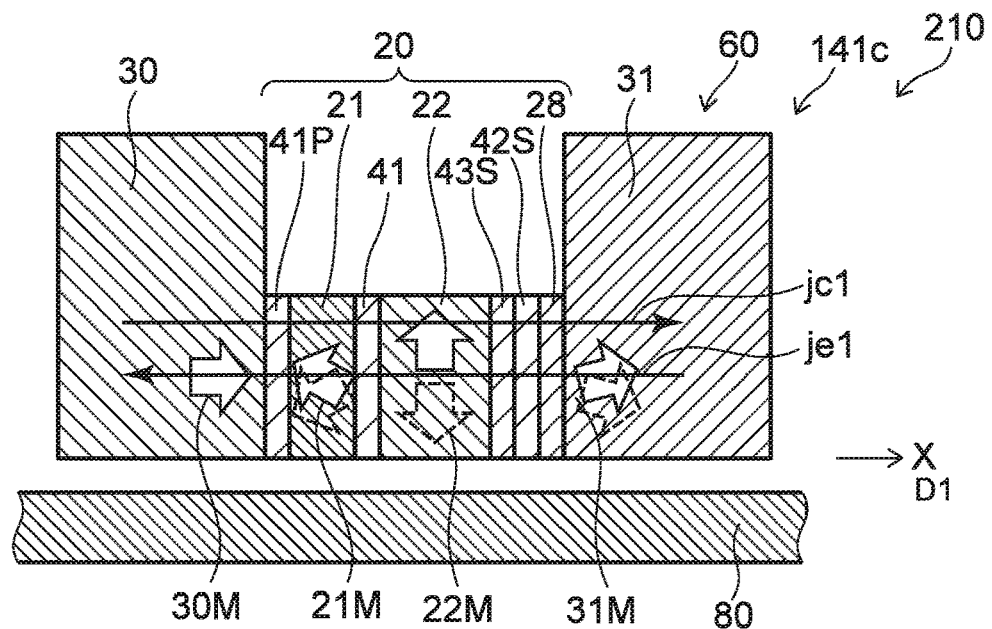
FIG. 14A and FIG. 14B are schematic cross-sectional views illustrating magnetic heads according to the second embodiment.

In a magnetic head 141c according to the embodiment as shown in FIG. 14A, the stacked body 20 further includes the shield-side third intermediate layer 43S. The shield-side second intermediate layer 42S is provided between the shield-side third intermediate layer 43S and the first layer 28. The shield-side third intermediate layer 43S includes at least one selected from the group consisting of Ta, Pt, W, Ir, Mo, Cr, Tb, Mn, and Ni. For example, the shield-side third intermediate layer 43S functions as a layer that attenuates (e.g., quenches) the spin. By providing the shield-side third intermediate layer 43S, the operating current can be reduced further.

Figure 14B:
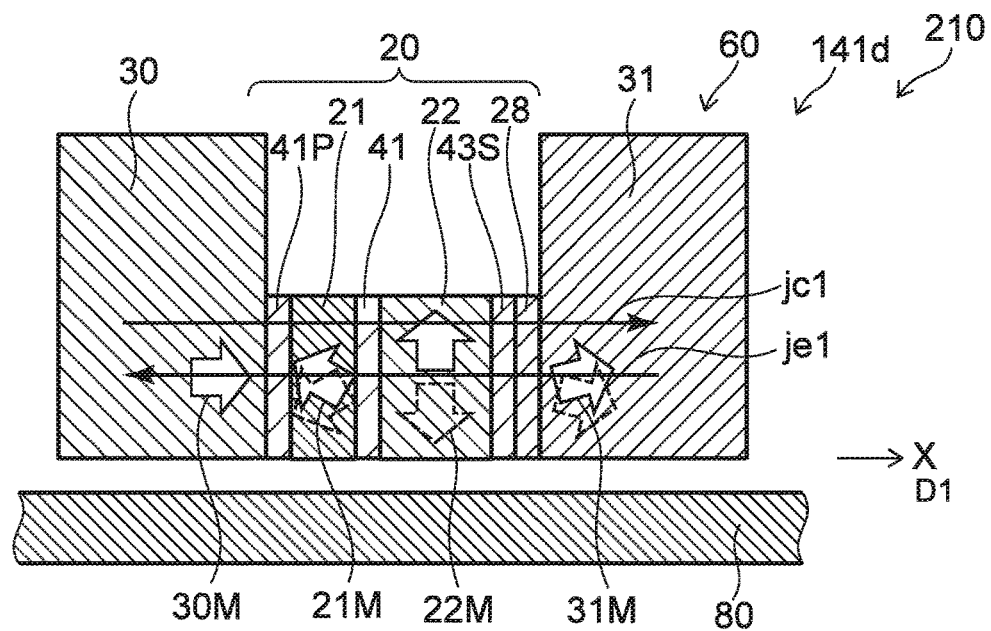
Figure 15A:
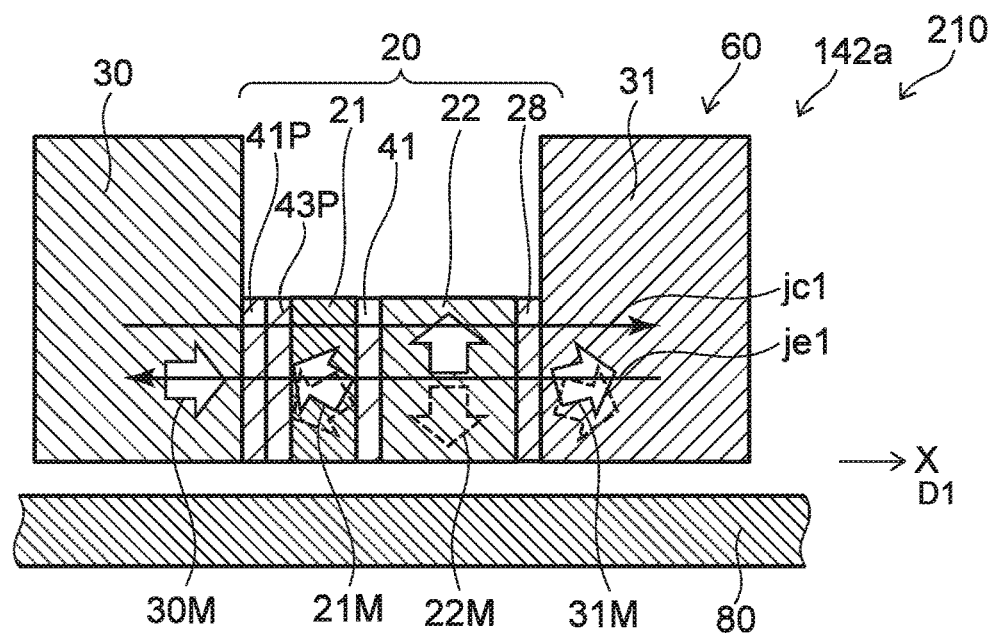
FIG. 15A and FIG. 15B are schematic cross-sectional views illustrating magnetic heads according to the second embodiment.
Figure 15B:
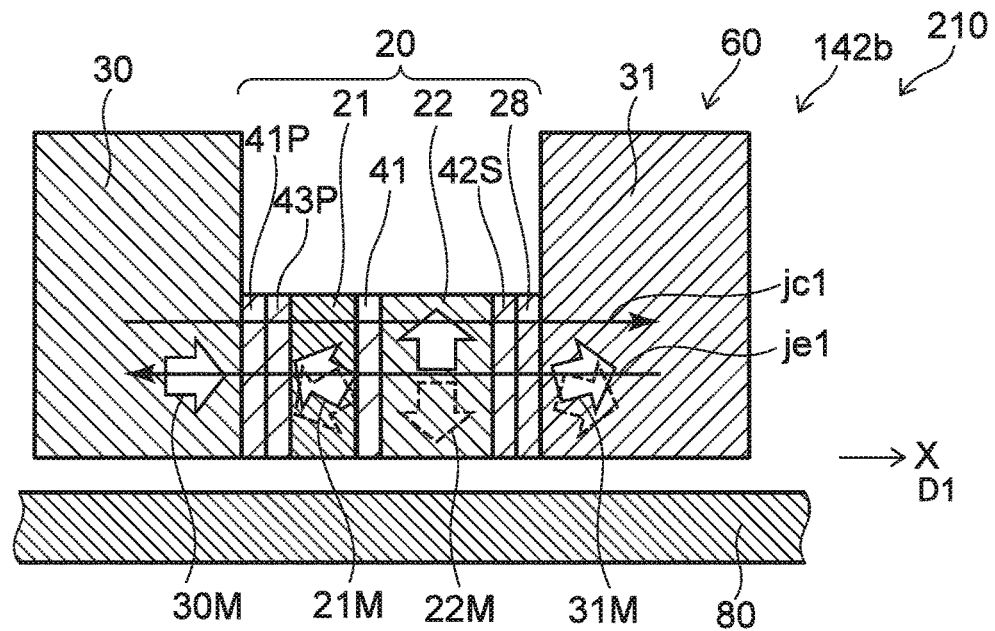
Figure 16A:
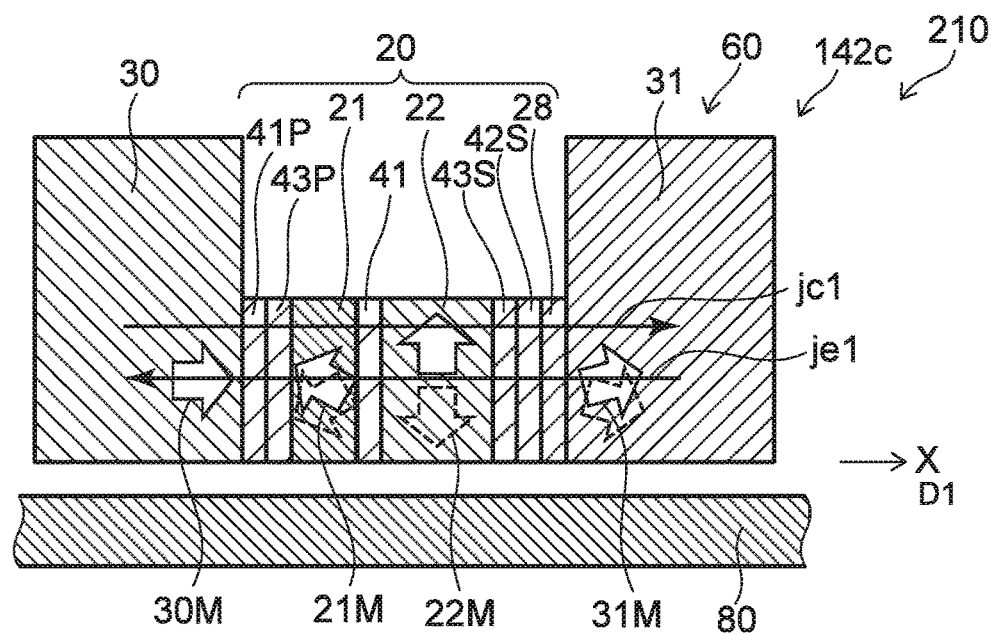
FIG. 16A and FIG. 16B are schematic cross-sectional views illustrating magnetic heads according to the second embodiment.
Figure 16B:
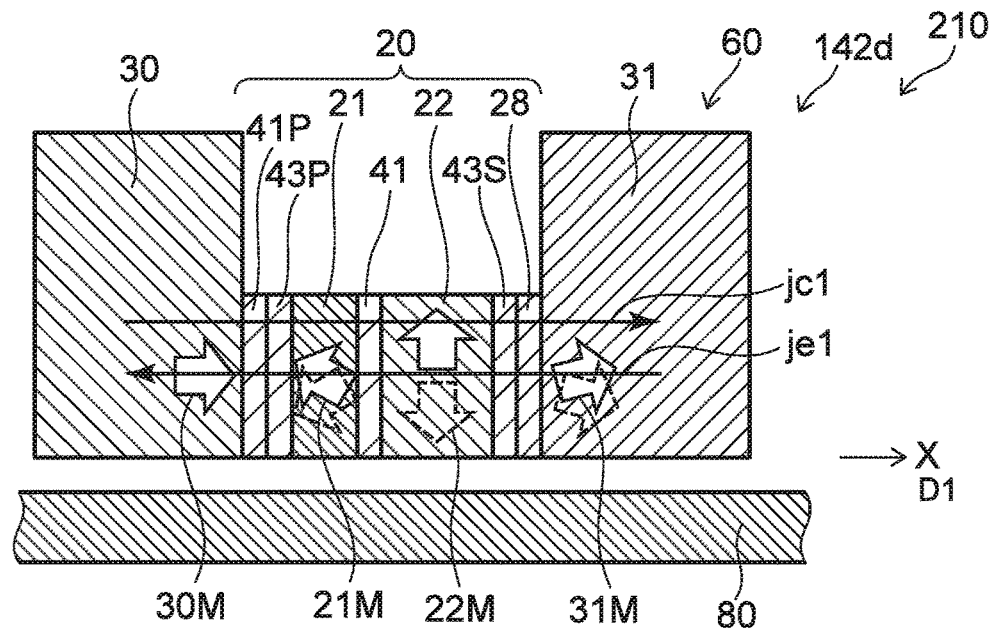

In a magnetic head 141d according to the embodiment as shown in FIG. 14B, the stacked body 20 includes the shield-side third intermediate layer 43S, and the shield-side second intermediate layer 42S is omitted. In this configuration as well, for example, the operating current can be reduced further.

FIG. 15A, FIG. 15B, FIG. 16A, and FIG. 16B are schematic cross-sectional views illustrating magnetic heads according to the second embodiment.

In magnetic heads 142a to 142d according to the embodiment as shown in FIG. 15A, FIG. 15B, FIG. 16A, and FIG. 16B, the stacked body 20 further includes the magnetic pole-side third intermediate layer 43P. The magnetic pole-side third intermediate layer 43P is provided between the magnetic pole-side first intermediate layer 41P and the first magnetic layer 21. The magnetic pole-side third intermediate layer 43P includes at least one selected from the group consisting of Ta, Pt, W, Ir, Mo, Cr, Tb, Mn, and Ni; otherwise, the magnetic heads 142a to 142d have configurations similar to those of the magnetic heads 141a to 141d. For example, the magnetic pole-side third intermediate layer 43P functions as a layer that attenuates (e.g., quenches) the spin. For example, the operating current can be reduced further.

FIG. 17A, FIG. 17B, FIG. 18A, and FIG. 18B are schematic cross-sectional views illustrating magnetic heads according to the second embodiment.

Figure 17A:
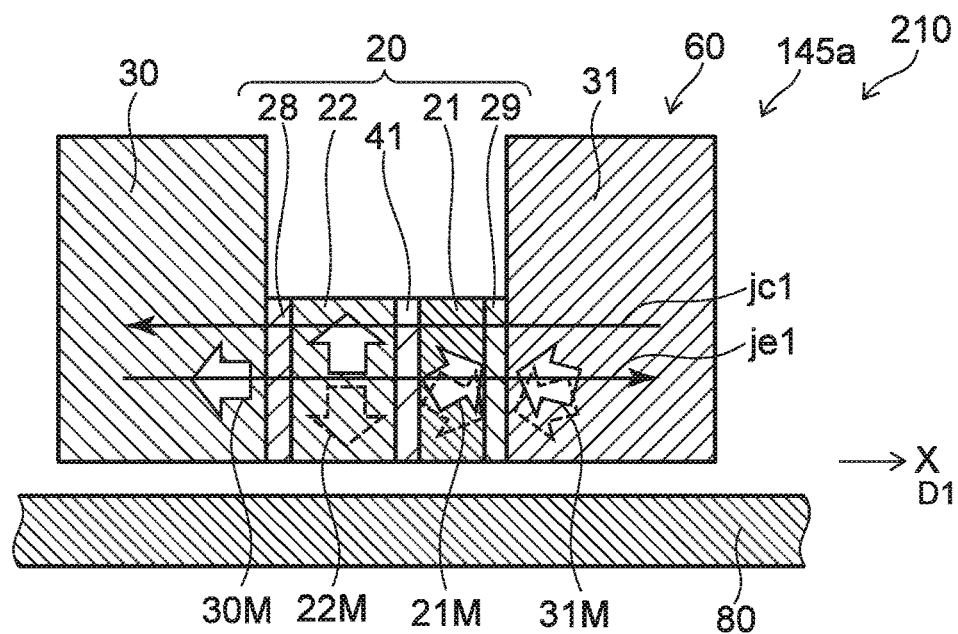
FIG. 17A and FIG. 17B are schematic cross-sectional views illustrating magnetic heads according to the second embodiment.

As shown in FIG. 17A, a magnetic head 145a according to the embodiment includes the recording portion 60. The recording portion 60 includes the magnetic pole 30, the shield 31, and the stacked body 20 provided between the magnetic pole 30 and the shield 31. The stacked body 20 includes the first magnetic layer 21, the second magnetic layer 22, the first layer 28, the first intermediate layer 41, and a second layer 29.

The second magnetic layer 22 is provided between the first magnetic layer 21 and the magnetic pole 30.

The first layer 28 is provided between the magnetic pole 30 and the second magnetic layer 22 and contacts the magnetic pole 30. The first layer 28 includes at least one selected from the group consisting of IrMn, PtMn, FeMn, PdMn, NiMn, RhMn, MnCr, and PtCr. The first layer 28 is, for example, an antiferromagnet layer.

The first intermediate layer 41 is provided between the first magnetic layer 21 and the second magnetic layer 22. The first intermediate layer 41 includes at least one selected from the first group consisting of Cu, Ag, Au, Al, Cr, and Ru.

The second layer 29 is provided between the first magnetic layer 21 and the shield 31 and contacts the shield 31. The second layer 29 includes at least one selected from the group consisting of IrMn, PtMn, FeMn, PdMn, NiMn, RhMn, MnCr, and PtCr. The second layer 29 is, for example, an antiferromagnet layer.

In the magnetic head 145a, the alternating-current magnetic field (the high frequency magnetic field) that is generated in the stacked body 20 is applied to a portion of the magnetic recording medium 80. The magnetization changes more easily at the application portion. For example, MAMR is performed.

In the embodiment, the first layer 28 that contacts the magnetic pole 30 is provided between the second magnetic layer 22 and the magnetic pole 30. For example, the dynamic coupling between the magnetic pole 30 and the second magnetic layer 22 is suppressed. The second layer 29 that contacts the shield 31 is provided between the first magnetic layer 21 and the shield 31. For example, the dynamic coupling between the shield 31 and the first magnetic layer 21 is suppressed. For example, the current (the operating current) at which the oscillation is generated can be reduced. Because the operating current can be reduced, the stacked body 20 can be downsized, and the recording gap can be reduced. Thereby, for example, a magnetic head can be provided in which the recording density can be increased.

Figure 17B:
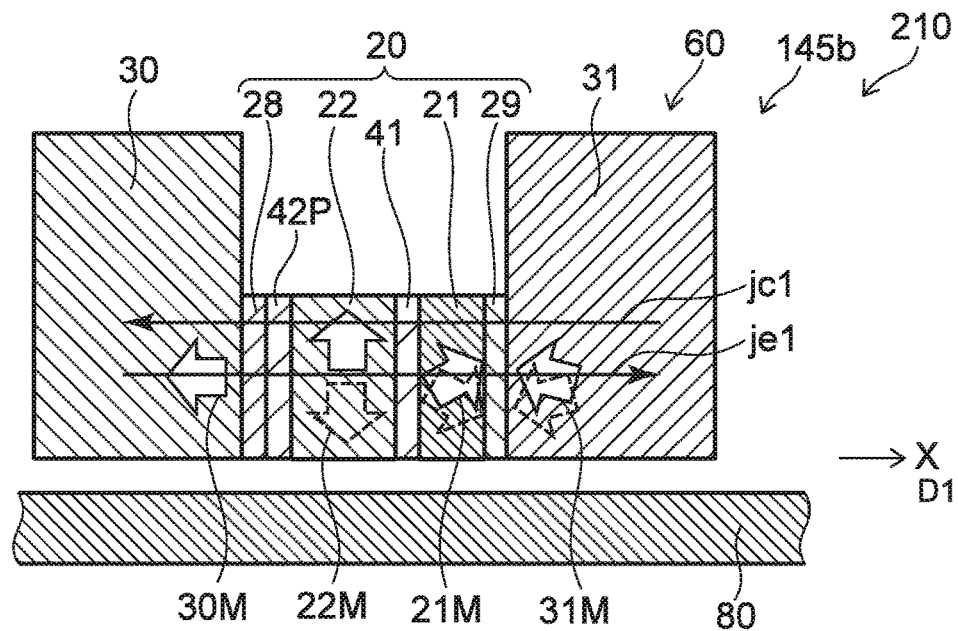

The stacked body 20 may further include the magnetic pole-side second intermediate layer 42P as in a magnetic head 145*b* shown in FIG. 17B. The magnetic pole-side second intermediate layer 42P is provided between the second magnetic layer 22 and the first layer 28. The magnetic pole-side second intermediate layer 42P includes at least one selected from the group consisting of Cu, Ag, Au, Al, Cr, Ru, and Ta. For example, the magnetic pole-side second intermediate layer 42P functions as a layer that reduces the damping. By providing the magnetic pole-side second intermediate layer 42P, the operating current can be reduced further.

Figure 18A:
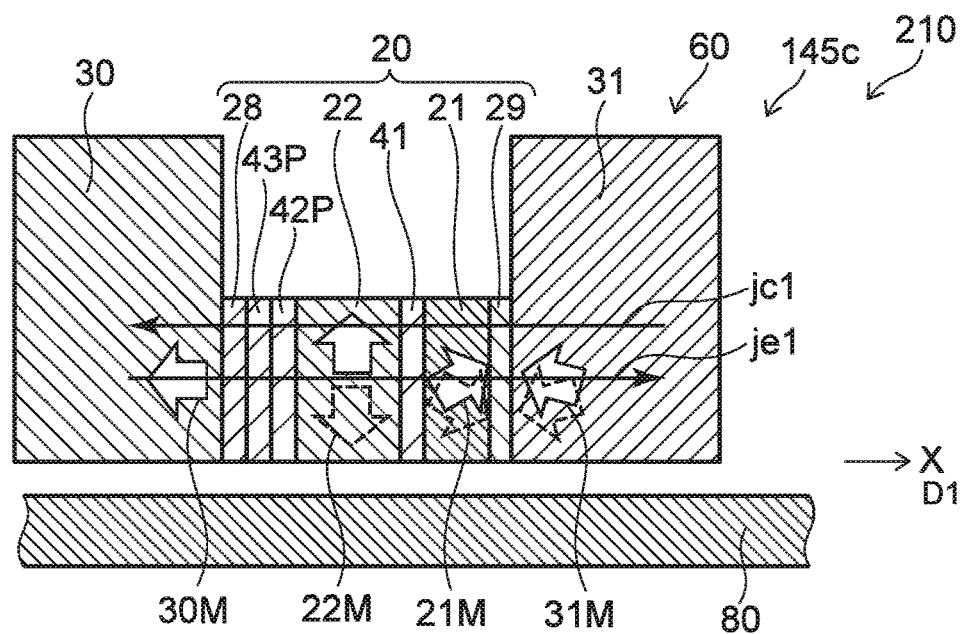
FIG. 18A and FIG. 18B are schematic cross-sectional views illustrating magnetic heads according to the second embodiment.

The stacked body 20 may further include the magnetic pole-side third intermediate layer 43P as in a magnetic head 145*c* shown in FIG. 18A. The magnetic pole-side third intermediate layer 43P is provided between the first layer 28 and the magnetic pole-side second intermediate layer 42P. The magnetic pole-side third intermediate layer 43P includes at least one selected from the group consisting of Ta, Pt, W, Ir, Mo, Cr, Tb, Mn, and Ni. For example, the magnetic pole-side third intermediate layer 43P functions as a layer that attenuates (e.g., quenches) the spin. By providing the magnetic pole-side third intermediate layer 43P, the operating current can be reduced further.

Figure 18B:
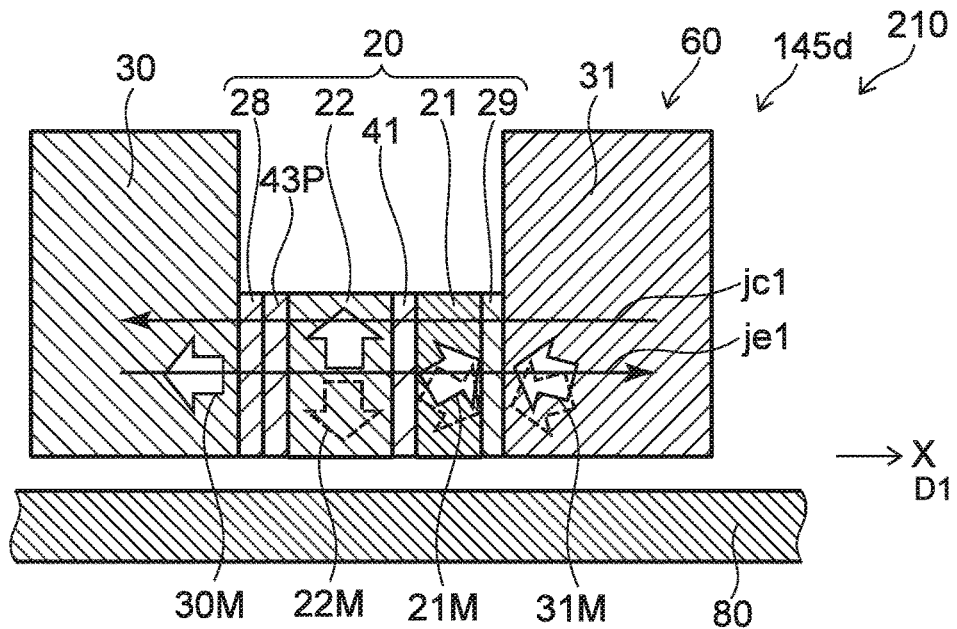
Figure 19A:
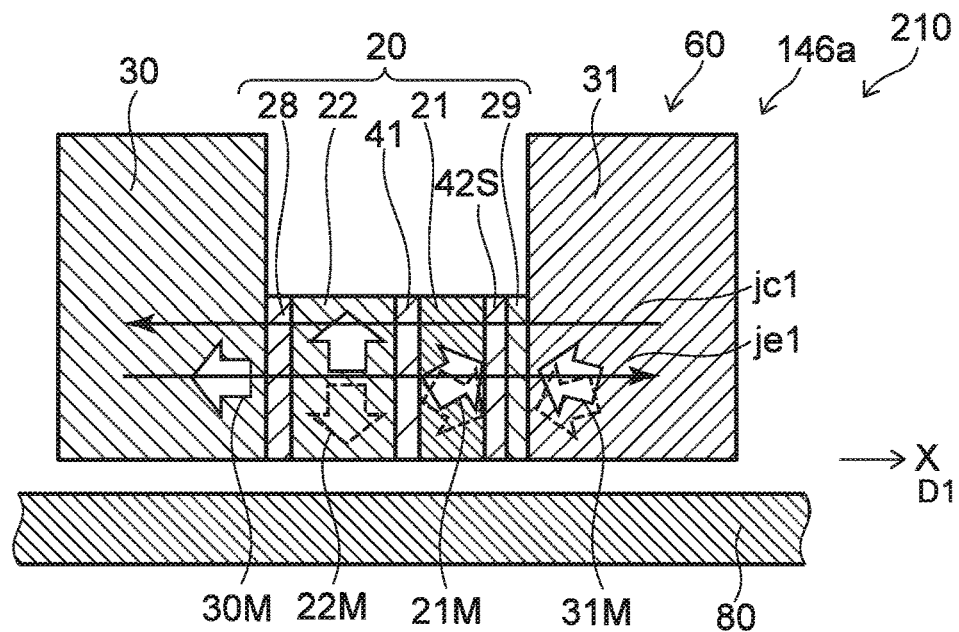
FIG. 19A and FIG. 19B are schematic cross-sectional views illustrating magnetic heads according to the second embodiment.
Figure 19B:
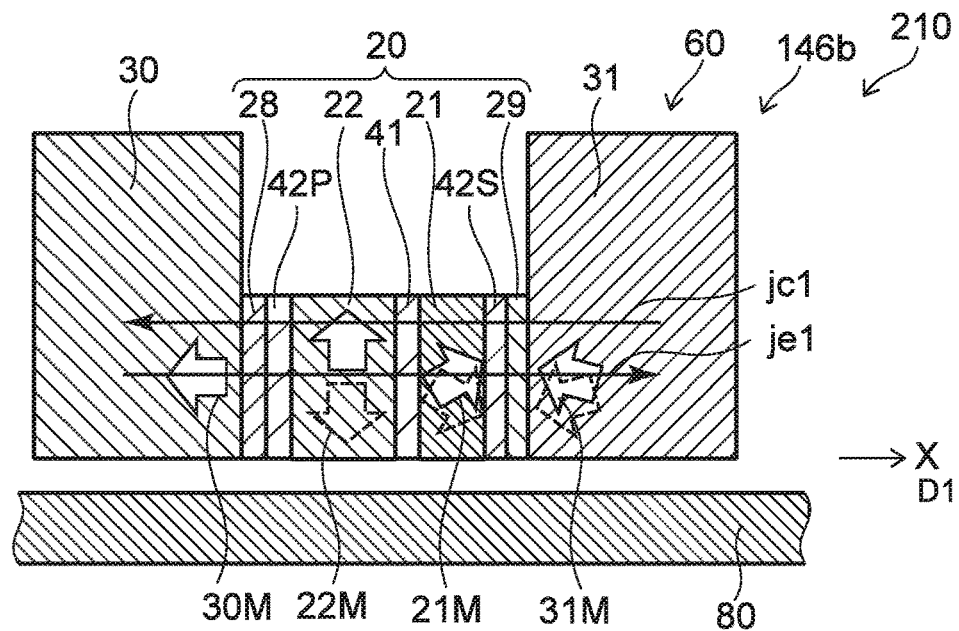
Figure 20A:
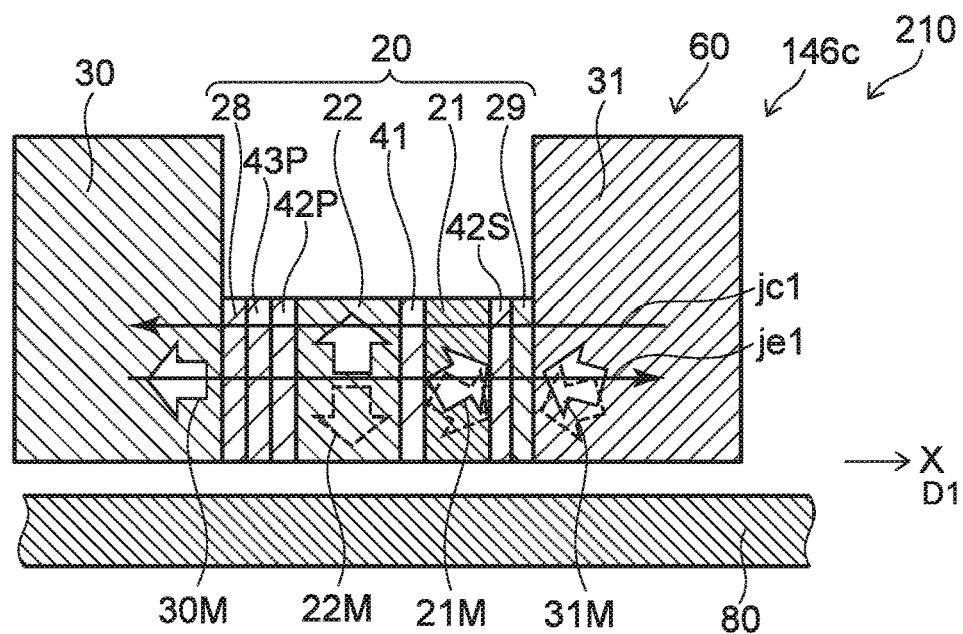
FIG. 20A and FIG. 20B are schematic cross-sectional views illustrating magnetic heads according to the second embodiment.
Figure 20B:
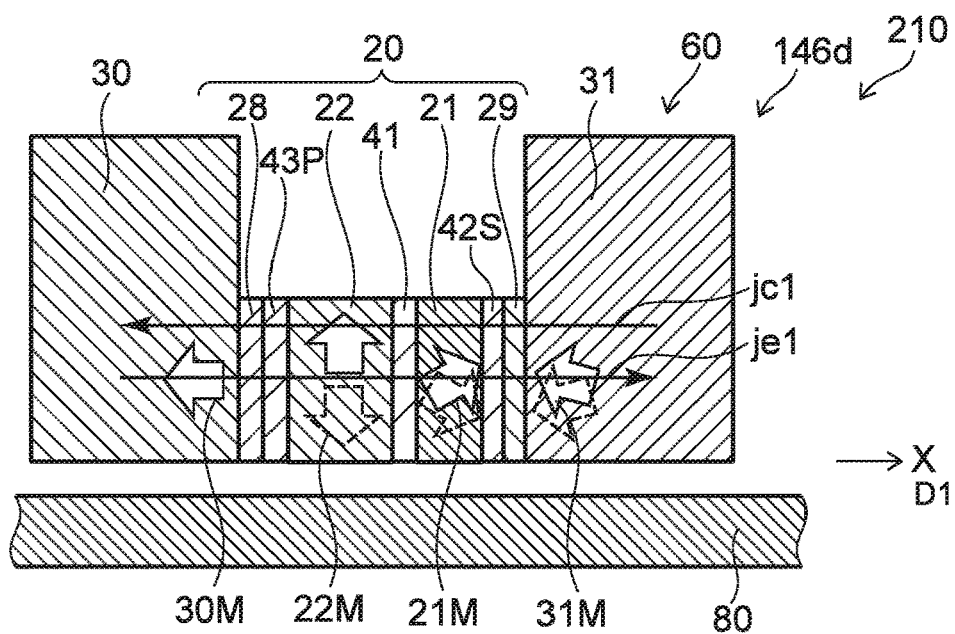
Figure 21A:
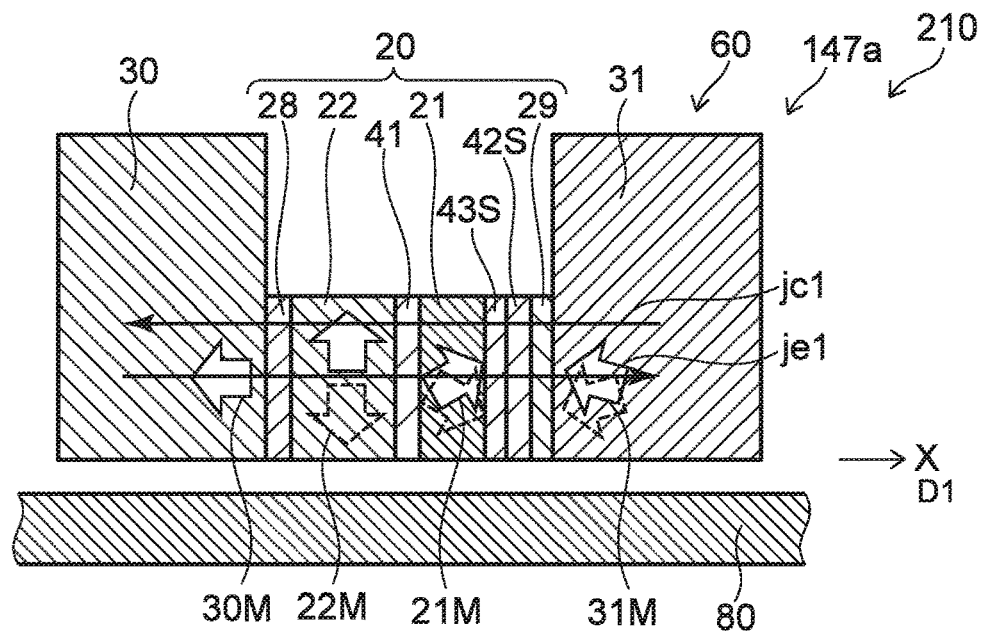
FIG. 21A and FIG. 21B are schematic cross-sectional views illustrating magnetic heads according to the second embodiment.
Figure 21B:
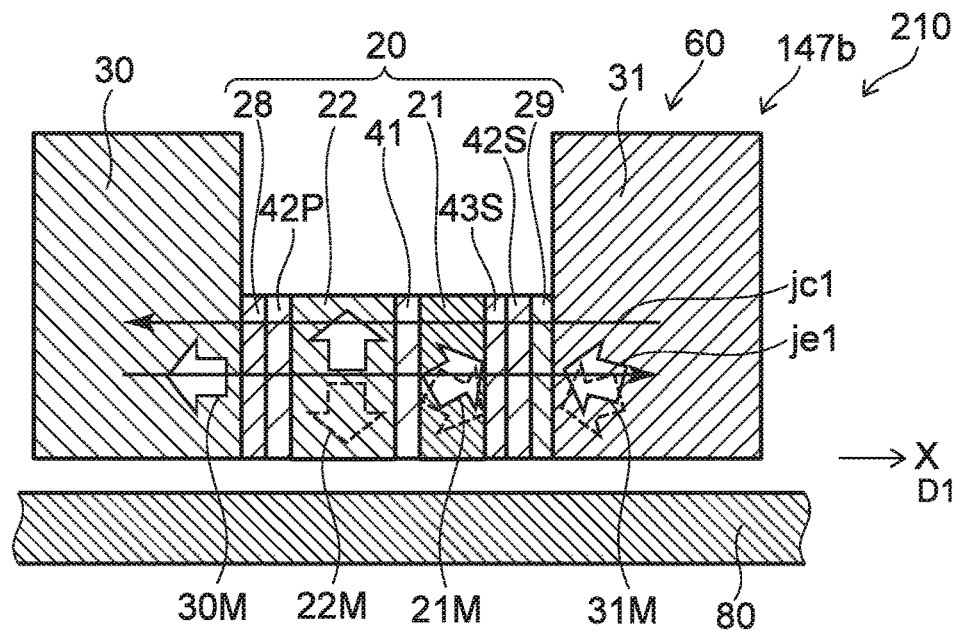
Figure 22A:
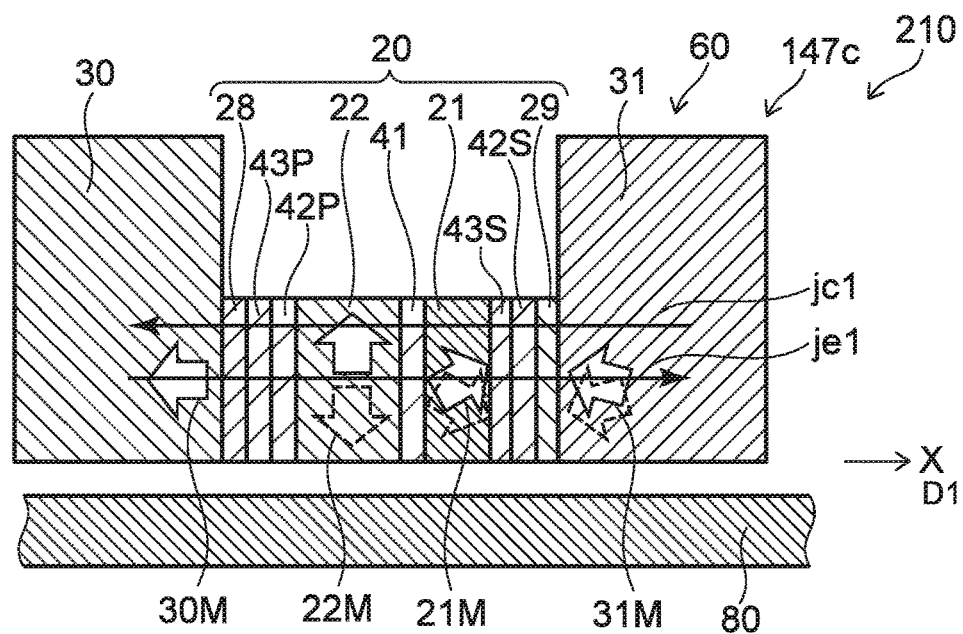
FIG. 22A and FIG. 22B are schematic cross-sectional views illustrating magnetic heads according to the second embodiment.
Figure 22B:
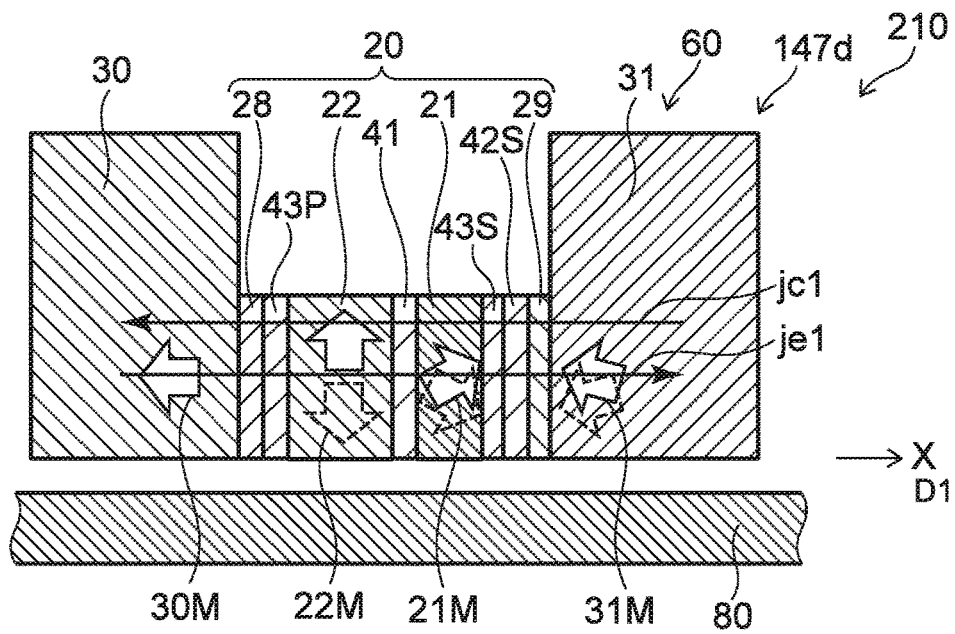

As in a magnetic head 145*d* shown in FIG. 18B, the stacked body 20 may include the magnetic pole-side third intermediate layer 43P, and the magnetic pole-side second intermediate layer 42P may be omitted. The magnetic pole-side third intermediate layer 43P is provided between the second magnetic layer 22 and the first layer 28. The magnetic pole-side third intermediate layer 43P includes at least one selected from the group consisting of Ta, Pt, W, Ir, Mo, Cr, Tb, Mn, and Ni.

FIG. 19A, FIG. 19B, FIG. 20A, and FIG. 20B are schematic cross-sectional views illustrating magnetic heads according to the second embodiment.

In magnetic heads 146*a* to 146*d* according to the embodiment as shown in FIG. 19A, FIG. 19B, FIG. 20A, and FIG. 20B, the stacked body 20 further includes the shield-side second intermediate layer 42S. The shield-side second intermediate layer 42S is provided between the first magnetic layer 21 and the second layer 29. The shield-side second intermediate layer 42S includes at least one selected from the group consisting of Cu, Ag, Au, Al, Cr, Ru, and Ta. For example, the shield-side second intermediate layer 42S functions as a layer that reduces the damping. By providing the shield-side second intermediate layer 42S, the operating current can be reduced further.

FIG. 21A, FIG. 21B, FIG. 22A, and FIG. 22B are schematic cross-sectional views illustrating magnetic heads according to the second embodiment.

In magnetic heads 147*a* to 147*d* according to the embodiment as shown in FIG. 21A, FIG. 21B, FIG. 22A, and FIG. 22B, the stacked body 20 further includes the shield-side third intermediate layer 43S. The shield-side third intermediate layer 43S is provided between the first magnetic layer 21 and the shield-side second intermediate layer 42S. The shield-side third intermediate layer 43S includes at least one selected from the group consisting of Ta, Pt, W, Ir, Mo, Cr, Tb, Mn, and Ni. For example, the shield-side third intermediate layer 43S functions as a layer that attenuates (e.g., quenches) the spin. By providing the shield-side third intermediate layer 43S, the operating current can be reduced further.

In the embodiment, the shield-side third intermediate layer 43S may be provided, and the shield-side second intermediate layer 42S may be omitted. In such a case, the shield-side third intermediate layer 43S is provided between the first magnetic layer 21 and the second layer 29. The shield-side third intermediate layer 43S includes at least one selected from the group consisting of Ta, Pt, W, Ir, Mo, Cr, Tb, Mn, and Ni. By providing the shield-side third intermediate layer 43S, the operating current can be reduced further.

In the first and second embodiments, it is favorable for the thickness (the length along a first direction D1) of at least one of the first layer 28 or the second layer 29 to be, for example, not less than 1 nm and not more than 10 nm. By setting the thickness to be 1 nm or more, for example, the effect of modulating the damping and/or the ferromagnetic resonant frequency of the magnetization at the surface of the magnetic pole 30 is easier to obtain. By setting the thickness to be 10 nm or more, for example, the decrease of the writing capability due to the recording gap being too wide can be suppressed.

In the first embodiment, it is favorable for the thickness of the first magnetic layer 21 to be not less than 2 nm and not more than 15 nm. By such a thickness, for example, the enhancement effect of the writing capability due to the reverse of the magnetization 21M is easier to obtain. By such a thickness, the decrease of the writing capability due to the recording gap being too wide can be suppressed.

In the second embodiment, it is favorable for the thickness of the first magnetic layer 21 to be not less than 2 nm and not more than 10 nm. It is favorable for the thickness of the second magnetic layer 22 to be not less than 5 nm and not more than 15 nm. By such a thickness, the enhancement effect of the writing capability due to the alternating-current magnetic field (the high frequency magnetic field) that is generated in the stacked body 20 is easier to obtain. By such a thickness, the decrease of the writing capability due to the recording gap being too wide can be suppressed.

It is favorable for the thickness of at least one of the first to fifth intermediate layers 41 to 45 to be not less than 2 nm and not more than 10 nm. By such a thickness, for example, the magnetic coupling can be broken, and efficient spin injection is easier to obtain. By such a thickness, the decrease of the writing capability due to the recording gap being too wide can be suppressed.

An example of the magnetic head and the magnetic recording medium according to the embodiment will now be described.

Figure 23:
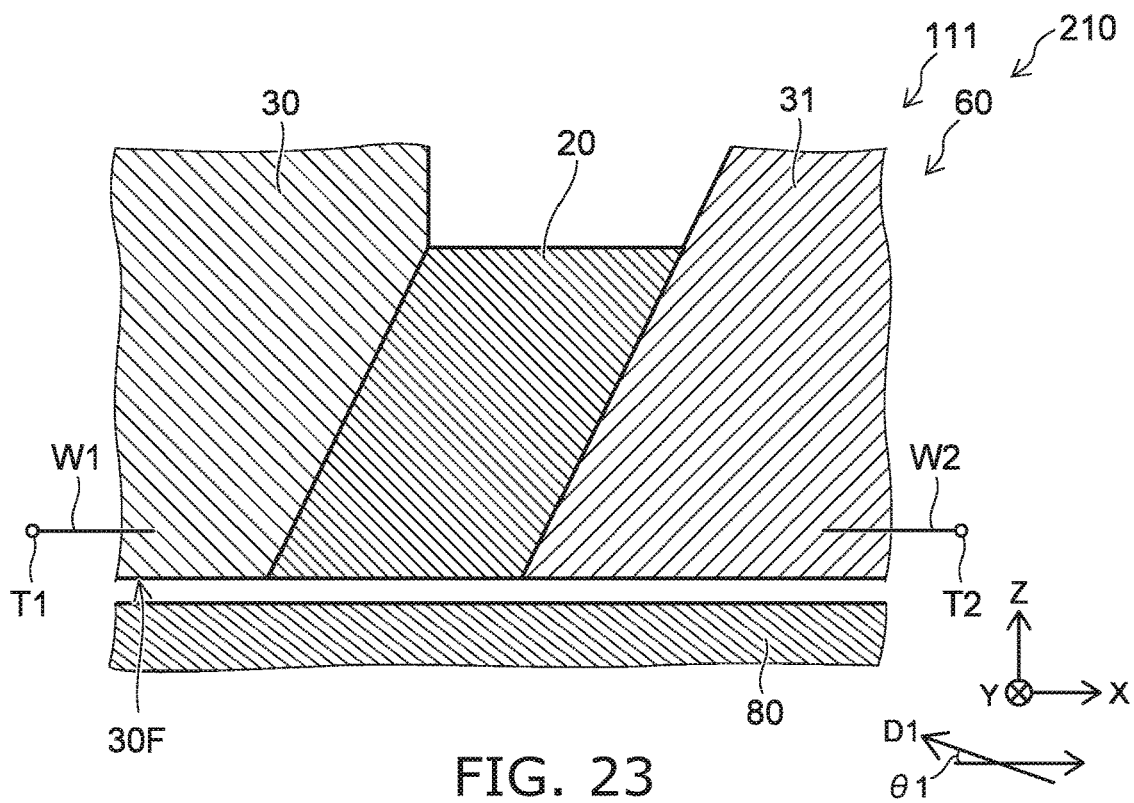
FIG. 23 is a schematic cross-sectional view illustrating the magnetic head according to the embodiment.

FIG. 23 is a schematic cross-sectional view illustrating the magnetic head according to the embodiment.

In the magnetic head (e.g., the magnetic head 111) according to the embodiment as shown in FIG. 23, the first direction D1 from the shield 31 toward the magnetic pole 30 may be tilted with respect to the X-axis direction. The first direction D1 corresponds to the stacking direction of the stacked body 20. The X-axis direction is along a medium-facing surface 30F of the magnetic pole 30. The angle between the first direction D1 and the medium-facing surface 30F is taken as an angle θ1. The angle θ1 is, for example, not less than 15 degrees and not more than 30 degrees. The angle θ1 may be 0 degrees.

When the first direction D1 is tilted with respect to the X-axis direction, the thicknesses of the layers correspond to the lengths along the first direction D1. The configuration in which the first direction D1 is tilted with respect to the X-axis direction is applicable to any magnetic head according to the first or second embodiment.

An example of the magnetic head and the magnetic recording medium according to the embodiment will now be described. An example of the magnetic head 111 will be described.

Figure 24:
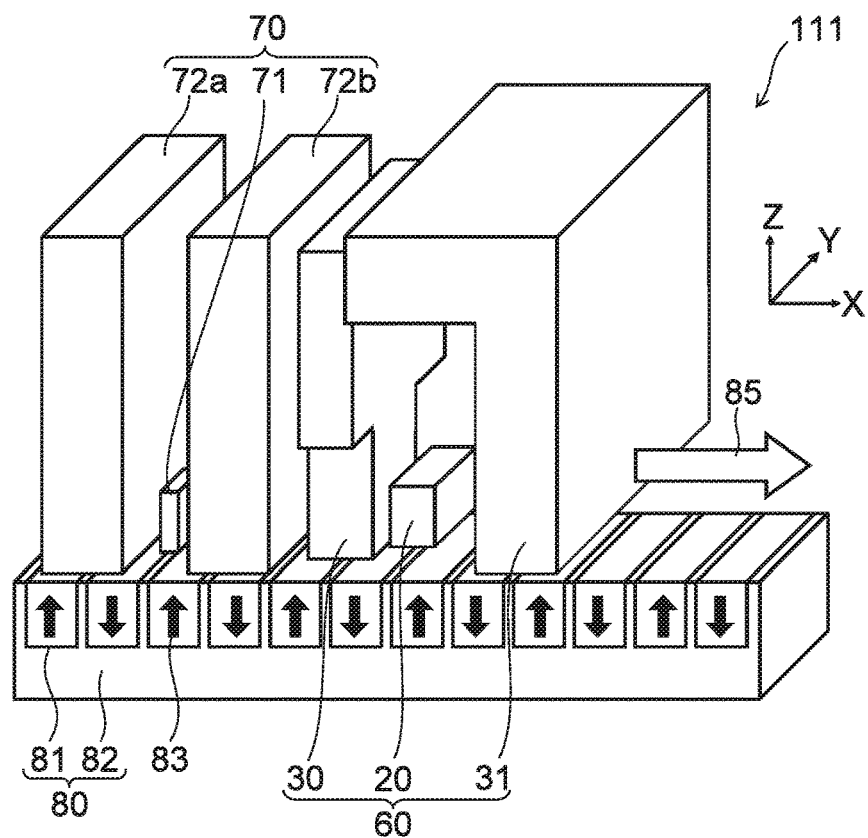
FIG. 24 is a schematic perspective view illustrating the magnetic recording device according to the embodiment.

FIG. 24 is a schematic perspective view illustrating the magnetic recording device according to the embodiment.

Figure 25:
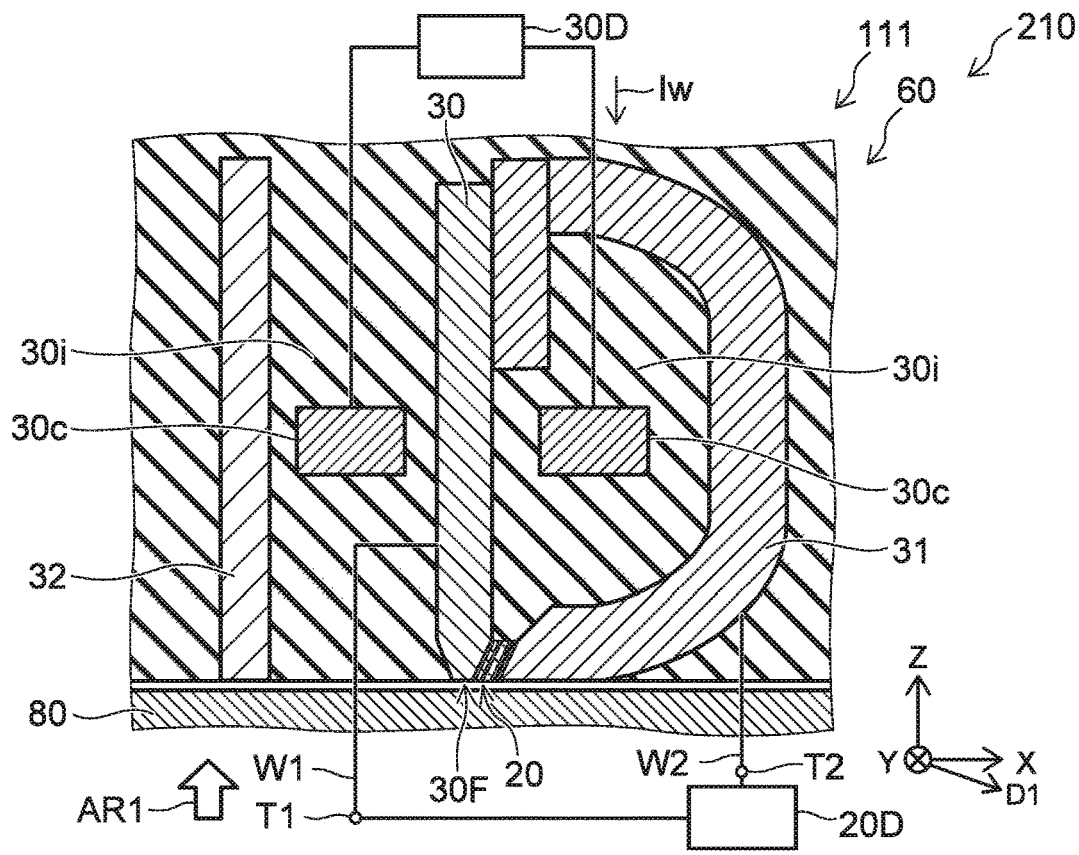
FIG. 25 is a schematic cross-sectional view illustrating the magnetic head according to the embodiment.

FIG. 25 is a schematic cross-sectional view illustrating the magnetic head according to the embodiment.

As shown in FIG. 24, the magnetic head 111 according to the embodiment is used with the magnetic recording medium 80. The magnetic recording device 210 according to the embodiment includes the magnetic head 111 and the magnetic recording medium 80. In the example, the magnetic head 111 includes the recording portion 60 and a reproducing portion 70. Information is recorded in the magnetic recording medium 80 by the recording portion 60 of the magnetic head 111. The information that is recorded in the magnetic recording medium 80 is reproduced by the reproducing portion 70.

The magnetic recording medium 80 includes, for example, a medium substrate 82, and a magnetic recording layer 81 provided on the medium substrate 82. A magnetization 83 of the magnetic recording layer 81 is controlled by the recording portion 60.

The reproducing portion 70 includes, for example, a first reproduction magnetic shield 72a, a second reproduction magnetic shield 72b, and a magnetic reproducing element 71. The magnetic reproducing element 71 is provided between the first reproduction magnetic shield 72a and the second reproduction magnetic shield 72b. The magnetic reproducing element 71 can output a signal corresponding to the magnetization 83 of the magnetic recording layer 81.

As shown in FIG. 24, the magnetic recording medium 80 moves relative to the magnetic head 111 in a medium movement direction 85. The information that corresponds to the magnetization 83 of the magnetic recording layer 81 at any position is controlled by the magnetic head 111. The information that corresponds to the magnetization 83 of the magnetic recording layer 81 at any position is reproduced by the magnetic head 111.

As shown in FIG. 25, a coil 30c is provided at the magnetic head 111. A recording current Iw is supplied from a recording circuit 30D to the coil 30c. A recording magnetic field that corresponds to the recording current Iw is applied from the magnetic pole 30 to the magnetic recording medium 80.

As shown in FIG. 25, the magnetic pole 30 includes the medium-facing surface 30F. The medium-facing surface 30F is, for example, an ABS (Air Bearing Surface). For example, the medium-facing surface 30F faces the magnetic recording medium 80.

A direction perpendicular to the medium-facing surface 30F is taken as a Z-axis direction. One direction perpendicular to the Z-axis direction is taken as the X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is, for example, the cross-track direction. As shown in FIG. 25, the electrical circuit 20D is electrically connected to the stacked body 20. In the example, the stacked body 20 is electrically connected to the magnetic pole 30 and the shield 31. A first terminal T1 and a second terminal T2 are provided in the magnetic head 111. The first terminal T1 is electrically connected to the stacked body 20 via wiring W1 and the magnetic pole 30. The second terminal T2 is electrically connected to the stacked body 20 via wiring W2 and the shield 31. For example, a current (e.g., a direct current) is supplied from the electrical circuit 20D to the stacked body 20.

As shown in FIG. 25, a second shield 32 may be provided in the recording portion 60. The magnetic pole 30 is provided between the second shield 32 and the shield 31. An insulating portion 30i is provided around the shield 31, the second shield 32, and the magnetic pole 30.

The magnetic recording device 210 according to the embodiment includes the magnetic head 111, and the magnetic recording medium 80 in which the information is recorded by the magnetic head 111. An example of the magnetic recording device according to the embodiment will now be described. The magnetic recording device may be a magnetic recording and reproducing device. The magnetic head may include a recording portion and a reproducing portion.

Figure 26:
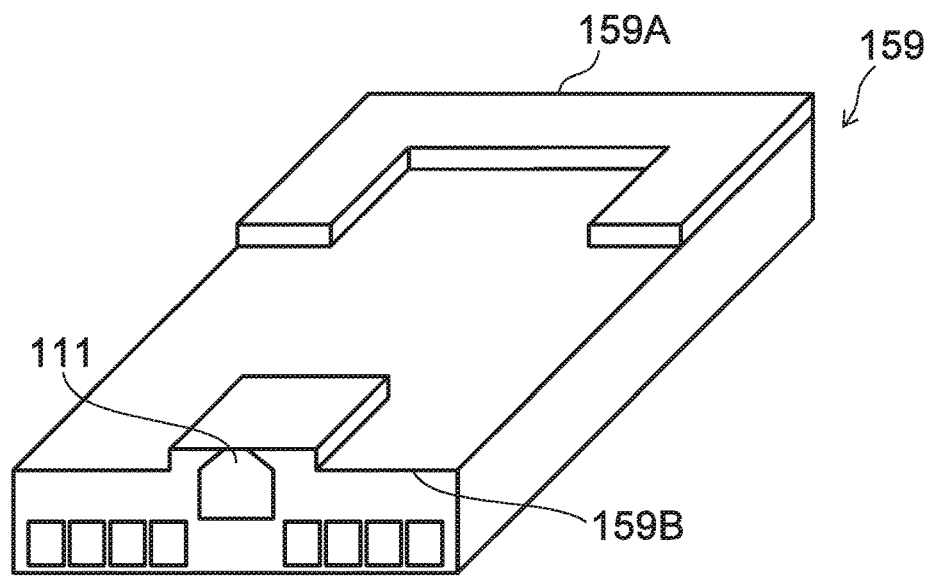
FIG. 26 is a schematic perspective view illustrating a portion of the magnetic recording device according to the embodiment.

FIG. 26 is a schematic perspective view illustrating a portion of the magnetic recording device according to the embodiment.

FIG. 26 illustrates a head slider.

The magnetic head 111 is provided in the head slider 159. The head slider 159 includes, for example, $A_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 111 is disposed at the side surface of the air outflow side 159B of the head slider 159 or the like. Thereby, the magnetic head 111 moves relative to the magnetic recording medium while flying over or contacting the magnetic recording medium.

Figure 27:
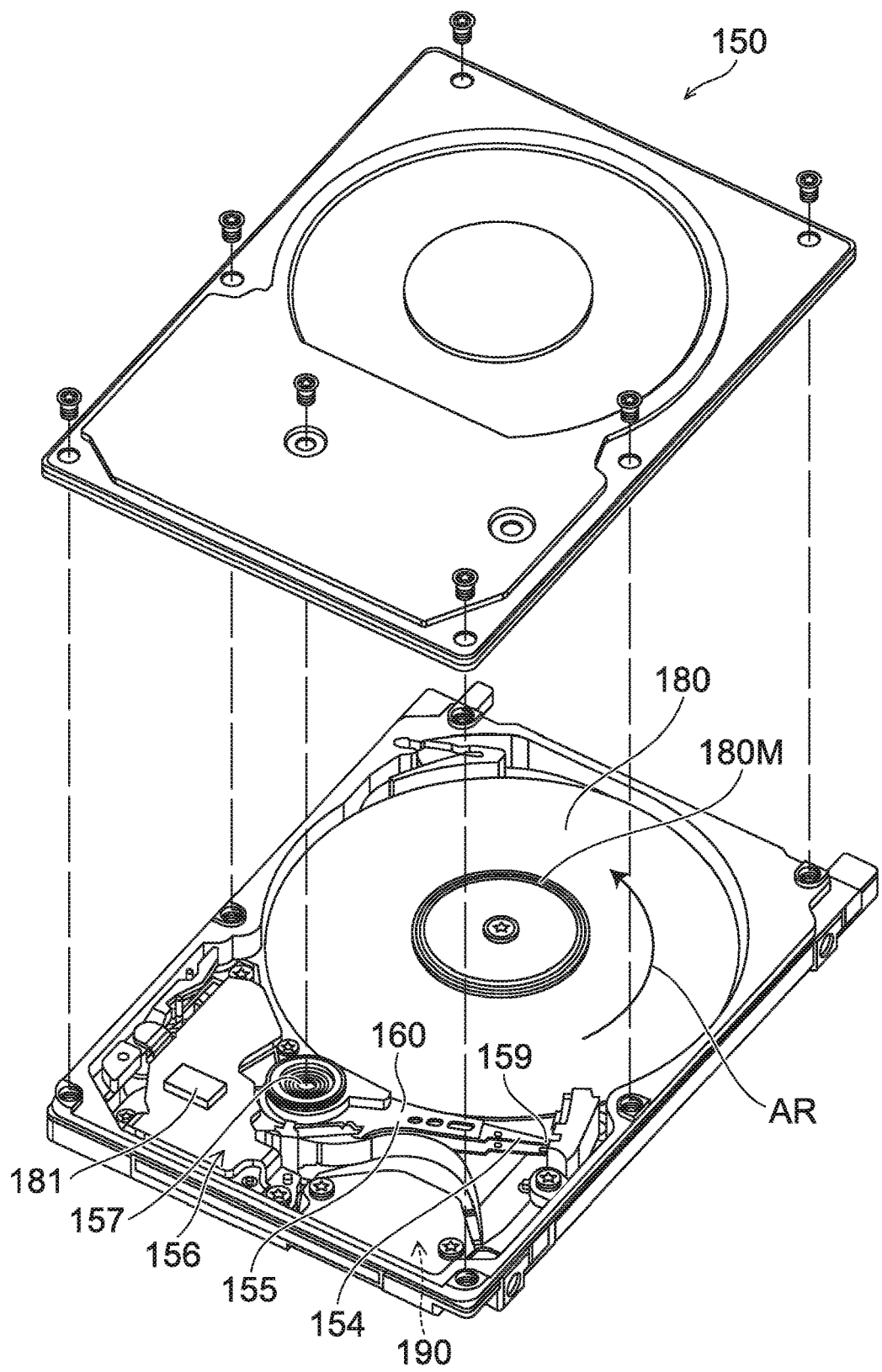
FIG. 27 is a schematic perspective view illustrating the magnetic recording device according to the embodiment.

FIG. 27 is a schematic perspective view illustrating the magnetic recording device according to the embodiment.

Figure 28A:
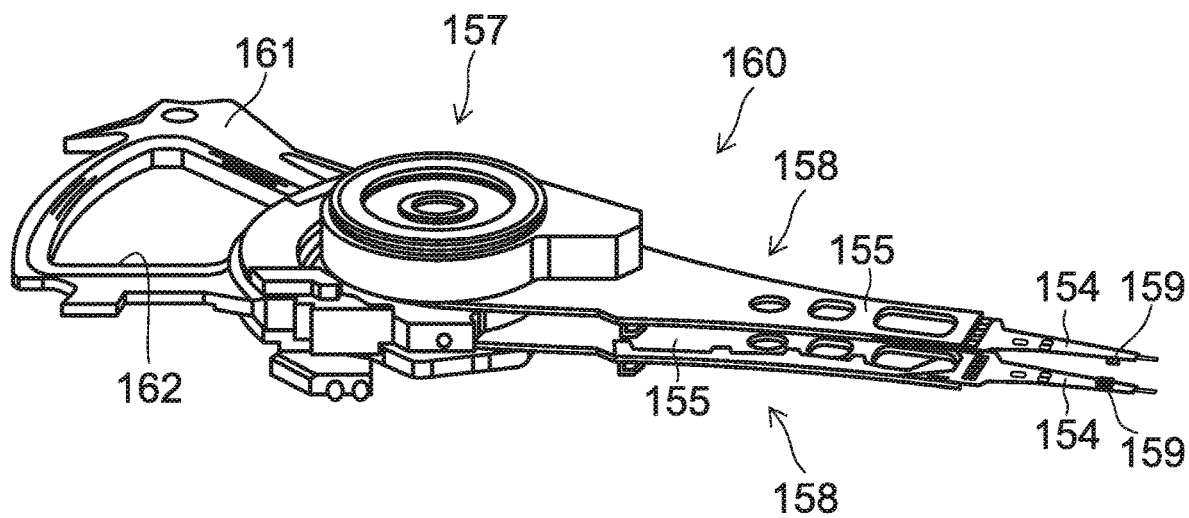
FIG. 28A and FIG. 28B are schematic perspective views illustrating a portion of the magnetic recording device according to the embodiment.
Figure 28B:
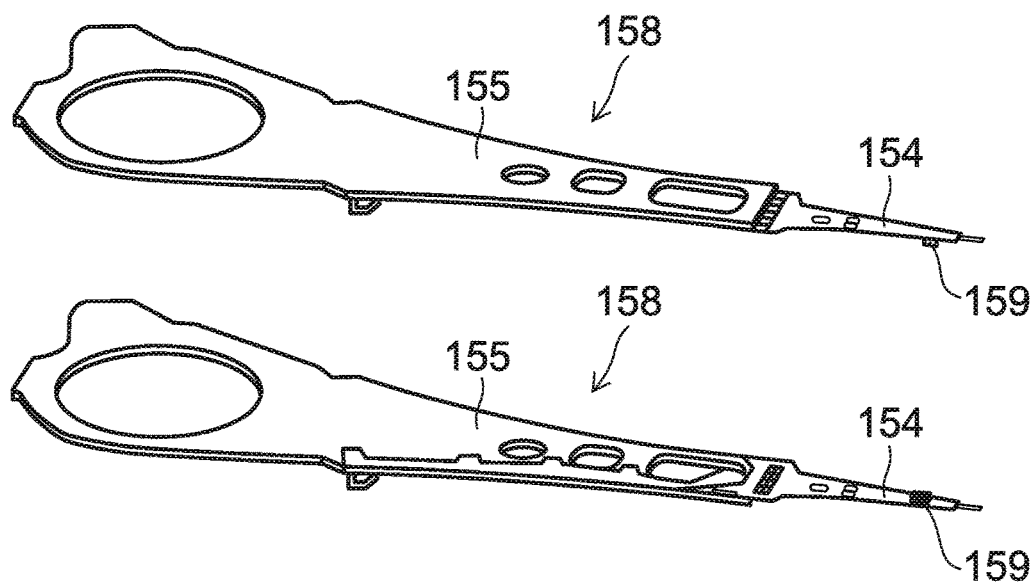

FIG. 28A and FIG. 28B are schematic perspective views illustrating a portion of the magnetic recording device according to the embodiment.

As shown in FIG. 27, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 includes one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 28A illustrates the configuration of a portion of the magnetic recording device and is an enlarged perspective view of a head stack assembly 160.

FIG. 28B is a perspective view illustrating a magnetic head assembly (a head gimbal assembly (HGA)) 158 that is a portion of the head stack assembly 160.

As shown in FIG. 28A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 28B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin-transfer torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The embodiments may include the following configurations (e.g., technological proposals).

Configuration 1

A magnetic head, comprising:
a recording portion including
a magnetic pole,
a shield, and
a stacked body provided between the magnetic pole and the shield,
the stacked body including
a first magnetic layer,
a first layer provided between the first magnetic layer and the magnetic pole, the first layer contacting the magnetic pole and including at least one selected from the group consisting of IrMn, PtMn, FeMn, PdMn, NiMn, RhMn, MnCr, and PtCr, and
a first intermediate layer provided between the first magnetic layer and the shield, the first intermediate layer including at least one selected from a first group consisting of Cu, Ag, Au, Al, Cr, and Ru.

Configuration 2

The magnetic head according to Configuration 1, wherein a current having an orientation from the shield toward the magnetic pole flows in the stacked body.

Configuration 3

A magnetic head, comprising:
a recording portion including
a magnetic pole,
a shield, and
a stacked body provided between the magnetic pole and the shield,
the stacked body including
a first magnetic layer,
a first layer provided between the first magnetic layer and the shield, the first layer contacting the shield and including at least one selected from the group consisting of IrMn, PtMn, FeMn, PdMn, NiMn, RhMn, MnCr, and PtCr, and
a first intermediate layer provided between the first magnetic layer and the magnetic pole, the first intermediate layer including at least one selected from a first group consisting of Cu, Ag, Au, Al, Cr, and Ru.

Configuration 4

The magnetic head according to Configuration 3, wherein a current having an orientation from the magnetic pole toward the shield flows in the stacked body.

Configuration 5

The magnetic head according to any one of Configurations 1 to 4, wherein
the stacked body further includes a second intermediate layer, and
the second intermediate layer is provided between the first magnetic layer and the first layer and includes at least one selected from a second group consisting of Cu, Ag, Au, Al, Cr, Ru, and Ta.

Configuration 6

The magnetic head according to Configuration 5, wherein the stacked body further includes a third intermediate layer, and the third intermediate layer is provided between the second intermediate layer and the first layer and includes at least one selected from a third group consisting of Ta, Pt, W, Ir, Mo, Cr, Tb, Mn, and Ni.

Configuration 7

The magnetic head according to any one of Configurations 1 to 4, wherein the stacked body further includes a third intermediate layer, and the third intermediate layer is provided between the first magnetic layer and the first layer and includes at least one selected from a third group consisting of Ta, Pt, W, Ir, Mo, Cr, Tb, Mn, and Ni.

Configuration 8

A magnetic head, comprising:

a recording portion including a magnetic pole, a shield, and a stacked body provided between the magnetic pole and the shield, the stacked body including a first magnetic layer, a second magnetic layer provided between the first magnetic layer and the magnetic pole, a first layer provided between the second magnetic layer and the magnetic pole, the first layer contacting the magnetic pole and including at least one selected from the group consisting of IrMn, PtMn, FeMn, PdMn, NiMn, RhMn, MnCr, and PtCr, a first intermediate layer provided between the first magnetic layer and the second magnetic layer, the first intermediate layer including at least one selected from a first group consisting of Cu, Ag, Au, A1, Cr, and Ru, and a shield-side first intermediate layer provided between the first magnetic layer and the shield, the shield-side first intermediate layer including at least one selected from the group consisting of Ta, Pt, W, Ir, Mo, Cr, Tb, Mn, and Ni.

Configuration 9

The magnetic head according to Configuration 8, wherein a current having an orientation from the shield toward the magnetic pole flows in the stacked body.

Configuration 10

The magnetic head according to Configuration 8 or 9, wherein the stacked body further includes a shield-side third intermediate layer, and the shield-side third intermediate layer is provided between the first magnetic layer and the shield-side first intermediate layer and includes at least one selected from the group consisting of Ta, Pt, W, Ir, Mo, Cr, Tb, Mn, and Ni.

Configuration 11

The magnetic head according to any one of Configurations 8 to 10, wherein the stacked body further includes a magnetic pole-side second intermediate layer, and the magnetic pole-side second intermediate layer is provided between the second magnetic layer and the first layer and includes at least one selected from the group consisting of Cu, Ag, Au, A1, Cr, Ru, and Ta.

Configuration 12

The magnetic head according to Configuration 10, wherein the stacked body further includes a magnetic pole-side third intermediate layer, and the magnetic pole-side third intermediate layer is provided between the first layer and the magnetic pole-side second intermediate layer and includes at least one selected from the group consisting of Ta, Pt, W, Ir, Mo, Cr, Tb, Mn, and Ni.

Configuration 13

The magnetic head according to any one of Configurations 8 to 11, wherein the stacked body further includes a magnetic pole-side third intermediate layer, and the magnetic pole-side third intermediate layer is provided between the second magnetic layer and the first layer and includes at least one selected from the group consisting of Ta, Pt, W, Ir, Mo, Cr, Tb, Mn, and Ni.

Configuration 14

A magnetic head, comprising:

a recording portion including a magnetic pole, a shield, and a stacked body provided between the magnetic pole and the shield, the stacked body including a first magnetic layer, a second magnetic layer provided between the first magnetic layer and the shield, a first layer provided between the second magnetic layer and the shield, the first layer contacting the shield and including at least one selected from the group consisting of IrMn, PtMn, FeMn, PdMn, NiMn, RhMn, MnCr, and PtCr, a first intermediate layer provided between the first magnetic layer and the second magnetic layer, the first intermediate layer including at least one selected from a first group consisting of Cu, Ag, Au, A1, Cr, and Ru, and a magnetic pole-side first intermediate layer provided between the magnetic pole and the first magnetic layer, the magnetic pole-side first intermediate layer including at least one selected from the group consisting of Ta, Pt, W, Ir, Mo, Cr, Tb, Mn, and Ni.

Configuration 15

The magnetic head according to Configuration 14, wherein a current having an orientation from the magnetic pole toward the shield flows in the stacked body.

Configuration 16

The magnetic head according to Configuration 14 or 15, wherein the stacked body further includes a magnetic pole-side third intermediate layer, and the magnetic pole-side third intermediate layer is provided between the first layer and the first magnetic layer and includes at least one selected from the group consisting of Ta, Pt, W, Ir, Mo, Cr, Tb, Mn, and Ni.

Configuration 17

The magnetic head according to any one of Configurations 14 to 16, wherein the stacked body further includes a shield-side second intermediate layer, and the shield-side second intermediate layer is provided between the second magnetic layer and the first layer and includes at least one selected from the group consisting of Cu, Ag, Au, A1, Cr, Ru, and Ta.

Configuration 18

The magnetic head according to Configuration 17, wherein the stacked body further includes a shield-side third intermediate layer, and the shield-side third intermediate layer is provided between the shield-side second intermediate layer and the first layer and includes at least one selected from the group consisting of Ta, Pt, W, Ir, Mo, Cr, Tb, Mn, and Ni.

Configuration 19

The magnetic head according to any one of Configurations 14 to 17, wherein the stacked body further includes a magnetic pole-side third intermediate layer, and the magnetic pole-side third intermediate layer is provided between the second magnetic layer and the first layer and includes at least one selected from the group consisting of Ta, Pt, W, Ir, Mo, Cr, Tb, Mn, and Ni.

Configuration 20

A magnetic head, comprising:

a recording portion including a magnetic pole, a shield, and a stacked body provided between the magnetic pole and the shield, the stacked body including a first magnetic layer, a second magnetic layer provided between the magnetic pole and the first magnetic layer, a first layer provided between the magnetic pole and the second magnetic layer, the first layer contacting the magnetic pole and including at least one selected from the group consisting of IrMn, PtMn, FeMn, PdMn, NiMn, RhMn, MnCr, and PtCr, a first intermediate layer provided between the first magnetic layer and the second magnetic layer, the first intermediate layer including at least one selected from a first group consisting of Cu, Ag, Au, Al, Cr, and Ru, and a second layer provided between the first magnetic layer and the shield, the second layer contacting the shield and including at least one selected from the group consisting of IrMn, PtMn, FeMn, PdMn, NiMn, RhMn, MnCr, and PtCr.

Configuration 21

The magnetic head according to Configuration 20 or 21, wherein the stacked body further includes a magnetic pole-side second intermediate layer, and the magnetic pole-side second intermediate layer is provided between the second magnetic layer and the first layer and includes at least one selected from the group consisting of Cu, Ag, Au, Al, Cr, Ru, and Ta.

Configuration 22

The magnetic head according to Configuration 21, wherein the stacked body further includes a magnetic pole-side third intermediate layer, and the magnetic pole-side third intermediate layer is provided between the first layer and the magnetic pole-side second intermediate layer and includes at least one selected from the group consisting of Ta, Pt, W, Ir, Mo, Cr, Tb, Mn, and Ni.

Configuration 23

The magnetic head according to Configuration 20, wherein the stacked body further includes a magnetic pole-side third intermediate layer, and the magnetic pole-side third intermediate layer is provided between the second magnetic layer and the first layer and includes at least one selected from the group consisting of Ta, Pt, W, Ir, Mo, Cr, Tb, Mn, and Ni.

Configuration 24

The magnetic head according to any one of Configurations 20 to 23, wherein the stacked body further includes a shield-side second intermediate layer, and the shield-side second intermediate layer is provided between the first magnetic layer and the second layer and includes at least one selected from the group consisting of Cu, Ag, Au, Al, Cr, Ru, and Ta.

Configuration 25

The magnetic head according to Configuration 24, wherein the stacked body further includes a shield-side third intermediate layer, and the shield-side third intermediate layer is provided between the first magnetic layer and the magnetic pole-side second intermediate layer and includes at least one selected from the group consisting of Ta, Pt, W, Ir, Mo, Cr, Tb, Mn, and Ni.

Configuration 26

The magnetic head according to any one of Configurations 20 to 23, wherein the stacked body further includes a magnetic pole-side third intermediate layer, and the magnetic pole-side third intermediate layer is provided between the first magnetic layer and the second layer and includes at least one selected from the group consisting of Ta, Pt, W, Ir, Mo, Cr, Tb, Mn, and Ni.

Configuration 27

The magnetic head according to any one of Configurations 1 to 26, wherein the recording portion further includes a coil provided at the magnetic pole.

Configuration 28

A magnetic recording device, comprising:

the magnetic head according to any one of Configurations 1 to 27; and a magnetic recording medium, information being recorded in the magnetic recording medium by the recording portion.

According to the embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, shields, second shields, stacked bodies, alignment mark units, magnetic layers, nonmagnetic layers, layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a recording portion including
a magnetic pole,
a shield, and
a stacked body provided between the magnetic pole and the shield,
the stacked body including
a first magnetic layer,
a first layer provided between the first magnetic layer and the magnetic pole, the first layer contacting the magnetic pole and including at least one selected from the group consisting of IrMn, PtMn, FeMn, PdMn, NiMn, RhMn, MnCr, and PtCr, and
a first intermediate layer provided between the first magnetic layer and the shield, the first intermediate layer including at least one selected from a first group consisting of Cu, Ag, Au, A1, Cr, and Ru,
wherein
the stacked body further includes a second intermediate layer, and
the second intermediate layer is provided between the first magnetic layer and the first layer and includes at least one selected from a second group consisting of Cu, Ag, Au, A1, Cr, Ru, and Ta, and
the stacked body further includes a third intermediate layer, and
the third intermediate layer is provided between the second intermediate layer and the first layer and includes at least one selected from a third group consisting of Ta, Pt, W, Ir, Mo, Cr, Tb, Mn, and Ni.

2. The head according to claim 1, wherein
a current having an orientation from the shield toward the magnetic pole flows in the stacked body.

3. A magnetic recording device, comprising:
the magnetic head according to claim 1, and
a magnetic recording medium, information being recorded in the magnetic recording medium by the recording portion.

4. A magnetic head, comprising:
a recording portion including
a magnetic pole,
a shield, and
a stacked body provided between the magnetic pole and the shield,
the stacked body including
a first magnetic layer,
a first layer provided between the first magnetic layer and the shield, the first layer contacting the shield and including at least one selected from the group consisting of IrMn, PtMn, FeMn, PdMn, NiMn, RhMn, MnCr, and PtCr, and
a first intermediate layer provided between the first magnetic layer and the magnetic pole, the first intermediate layer including at least one selected from a first group consisting of Cu, Ag, Au, A1, Cr, and Ru,
wherein
the stacked body further includes a second intermediate layer, and
the second intermediate layer is provided between the first magnetic layer and the first layer and includes at least one selected from a second group consisting of Cu, Ag, Au, A1, Cr, Ru, and Ta, and
the stacked body further includes a third intermediate layer, and
the third intermediate layer is provided between the second intermediate layer and the first layer and includes at least one selected from a third group consisting of Ta, Pt, W, Ir, Mo, Cr, Tb, Mn, and Ni.

5. The head according to claim 4, wherein
a current having an orientation from the magnetic pole toward the shield flows in the stacked body.

6. A magnetic head, comprising:
a recording portion including
a magnetic pole,
a shield, and
a stacked body provided between the magnetic pole and the shield,
the stacked body including
a first magnetic layer,
a second magnetic layer provided between the first magnetic layer and the magnetic pole,
a first layer provided between the second magnetic layer and the magnetic pole, the first layer contacting the magnetic pole and including at least one selected from the group consisting of IrMn, PtMn, FeMn, PdMn, NiMn, RhMn, MnCr, and PtCr,
a first intermediate layer provided between the first magnetic layer and the second magnetic layer, the first intermediate layer including at least one selected from a first group consisting of Cu, Ag, Au, A1, Cr, and Ru, and
a shield-side first intermediate layer provided between the first magnetic layer and the shield, the shield-side first intermediate layer including at least one selected from the group consisting of Ta, Pt, W, Ir, Mo, Cr, Tb, Mn, and Ni.

7. The head according to claim 6, wherein
a current having an orientation from the shield toward the magnetic pole flows in the stacked body.

8. The head according to claim 6, wherein
the stacked body further includes a shield-side third intermediate layer, and
the shield-side third intermediate layer is provided between the first magnetic layer and the shield-side first intermediate layer and includes at least one selected from the group consisting of Ta, Pt, W, Ir, Mo, Cr, Tb, Mn, and Ni.

9. The head according to claim 8, wherein
the stacked body further includes a magnetic pole-side third intermediate layer, and
the magnetic pole-side third intermediate layer is provided between the first layer and the magnetic pole-side second intermediate layer and includes at least one selected from the group consisting of Ta, Pt, W, Ir, Mo, Cr, Tb, Mn, and Ni.

10. The head according to claim 6, wherein
the stacked body further includes a magnetic pole-side second intermediate layer, and
the magnetic pole-side second intermediate layer is provided between the second magnetic layer and the first layer and includes at least one selected from the group consisting of Cu, Ag, Au, Al, Cr, Ru, and Ta.

11. The head according to claim 6, wherein
the stacked body further includes a magnetic pole-side third intermediate layer, and
the magnetic pole-side third intermediate layer is provided between the second magnetic layer and the first layer and includes at least one selected from the group consisting of Ta, Pt, W, Ir, Mo, Cr, Tb, Mn, and Ni.

* * * * *

UNITED STATES PATENT AND TRADEMARK OFFICE
CERTIFICATE OF CORRECTION

PATENT NO. : 11,217,272 B2
APPLICATION NO. : 17/015493
DATED : January 4, 2022
INVENTOR(S) : Hirofumi Suto et al.

It is certified that error appears in the above-identified patent and that said Letters Patent is hereby corrected as shown below:

In the Claims

Claim 1, Column 21, Line 38 and Line 45, "A1" should read --Al--.

Claim 4, Column 22, Line 9 and Line 17, "A1" should read --Al--.

Claim 6, Column 22, Line 45, "A1" should read --Al--.

Claim 10, Column 23, Line 10, "A1" should read --Al--.

Signed and Sealed this
Third Day of January, 2023

Katherine Kelly Vidal
*Director of the United States Patent and Trademark Office*